United States Patent
Wallace et al.

(10) Patent No.: US 10,320,582 B1
(45) Date of Patent: Jun. 11, 2019

(54) SYSTEM FOR SMART SPOILAGE ALERTS

(71) Applicant: Perfect Company, Inc., Vancouver, WA (US)

(72) Inventors: Michael Wayne Wallace, Vancouver, WA (US); Daniel Short, Camas, WA (US)

(73) Assignee: Perfect Company, Inc., Vancouver, WA (US)

( * ) Notice: Subject to any disclaimer, the term of this patent is extended or adjusted under 35 U.S.C. 154(b) by 0 days.

(21) Appl. No.: 15/828,155

(22) Filed: Nov. 30, 2017

(51) Int. Cl.
*H04L 12/28* (2006.01)
*G06Q 10/08* (2012.01)
*G06K 17/00* (2006.01)

(52) U.S. Cl.
CPC ....... *H04L 12/2827* (2013.01); *G06Q 10/087* (2013.01); *H04L 12/2812* (2013.01); *G06K 2017/0051* (2013.01)

(58) Field of Classification Search
CPC .............. G06Q 10/087; G06Q 10/0875
USPC .................... 235/385, 375, 487; 705/28
See application file for complete search history.

(56) References Cited

U.S. PATENT DOCUMENTS

| | | | |
|---|---|---|---|
| 2012/0278190 A1* | 11/2012 | Brown | G06Q 10/087 705/21 |
| 2015/0290795 A1* | 10/2015 | Oleynik | G05B 19/42 700/257 |
| 2016/0026032 A1* | 1/2016 | Moore | G06K 7/10316 382/103 |
| 2017/0132550 A1* | 5/2017 | Jones | G06Q 10/06315 |
| 2018/0129998 A1* | 5/2018 | Frazier | G06Q 10/06315 |
| 2018/0137462 A1* | 5/2018 | Zohar | G06Q 10/0875 |
| 2018/0239319 A1* | 8/2018 | Abdoo | G05B 15/02 |
| 2018/0249735 A1* | 9/2018 | Espinosa | A23L 3/003 |

* cited by examiner

*Primary Examiner* — Edwyn Labaze
(74) *Attorney, Agent, or Firm* — Lee & Hayes, P.C.

(57) ABSTRACT

This system describe relates to a smart pantry system that is able to determine when a food item stored in a pantry of a user has expired or is about to expire. The system may also predict an estimated time at which a food item is going to be fully consumed, and then provide alerts and/or recipe recommendations to assist the user in consuming the food item before its expiration date. The smart pantry system may estimate the time at which the food item is going to be fully consumed based on verified consumption events of the food item. A verified consumption event corresponds to a consumption event for which the smart pantry system has obtained corroborating data that verifies the consumption of the food item. For example, a verified consumption event may be corroborated in light of corroborated point of consumption (POC) data.

16 Claims, 8 Drawing Sheets

DATA STORE 114

FOOD ITEM DATA 402

| Identifier | Type | Brand | Unit Size | Qty. | Amt. | Date Purchased | Expiration Date | ... |
|---|---|---|---|---|---|---|---|---|
| 0088267141676 | Almonds | Nut-vana | 2.0 oz. Tin | 1 | 1.3 oz. | 6/4/17 | 3/4/18 | ... |
| 0025092389026 | Bananas | --- | Individual | 7 | 7 | 6/22/17 | 6/26/17 | ... |
| 0063453252234 | Bell Pepper | --- | Individual | 2 | 1.5 | 6/22/17 | 7/6/17 | ... |
| 0035345222543 | Black Beans | Vegan Supply | 8 oz. Can | 5 | 40 oz. | 4/4/17 | 4/4/18 | ... |
| 0034536887730 | Butter | sMOOth | 1 Stick | 4 | 3.7 sticks | 6/4/17 | 7/4/17 | ... |
| 0028462211455 | Chocolate Chips | G.P. | 12 oz. Bag | 1 | 0.3 oz. | 6/4/17 | 10/4/17 | ... |
| 0034345635330 | Cocoa Power | G.P | 6 oz. Tin | 1 | 4 oz. | 12/4/16 | 12/4/18 | ... |
| 0034535867730 | Cornmeal | Queen Cornmeal | 16 oz. Bag. | 2 | 39.5 oz. | 6/4/17 | 6/4/20 | ... |
| 0033658584452736 | Cucumber | --- | Individual | 2 | 1.25 | 6/22/17 | 7/6/17 | ... |
| 0034463962650 | Coconut Milk | Vegan Supply | 18 fl. oz. | 1 | 2.3 fl. oz. | 6/4/17 | 6/24/17 | ... |

USER COMPUTING DEVICE(S) 102

PANTRY SERVICE 122

FIG. 4

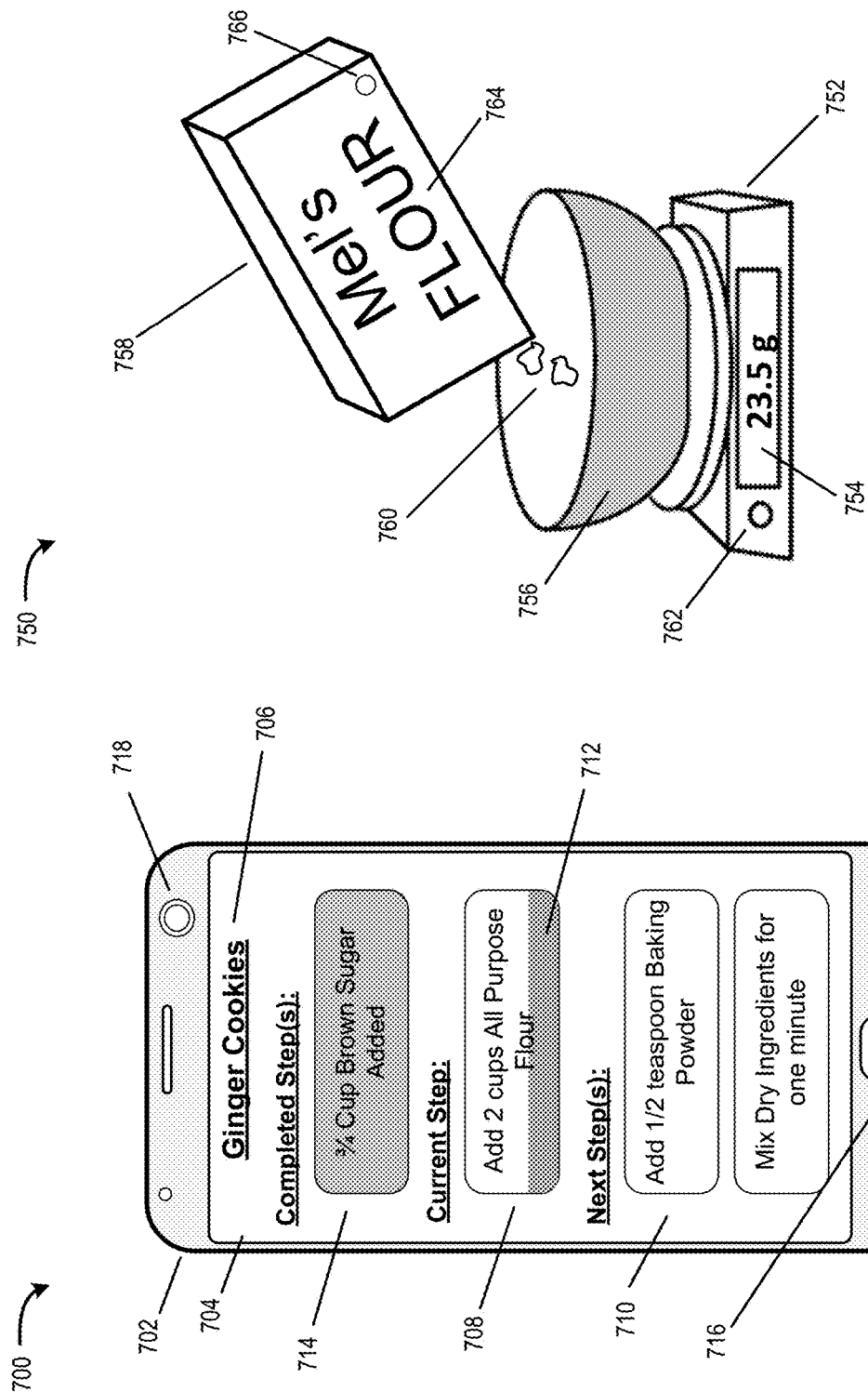

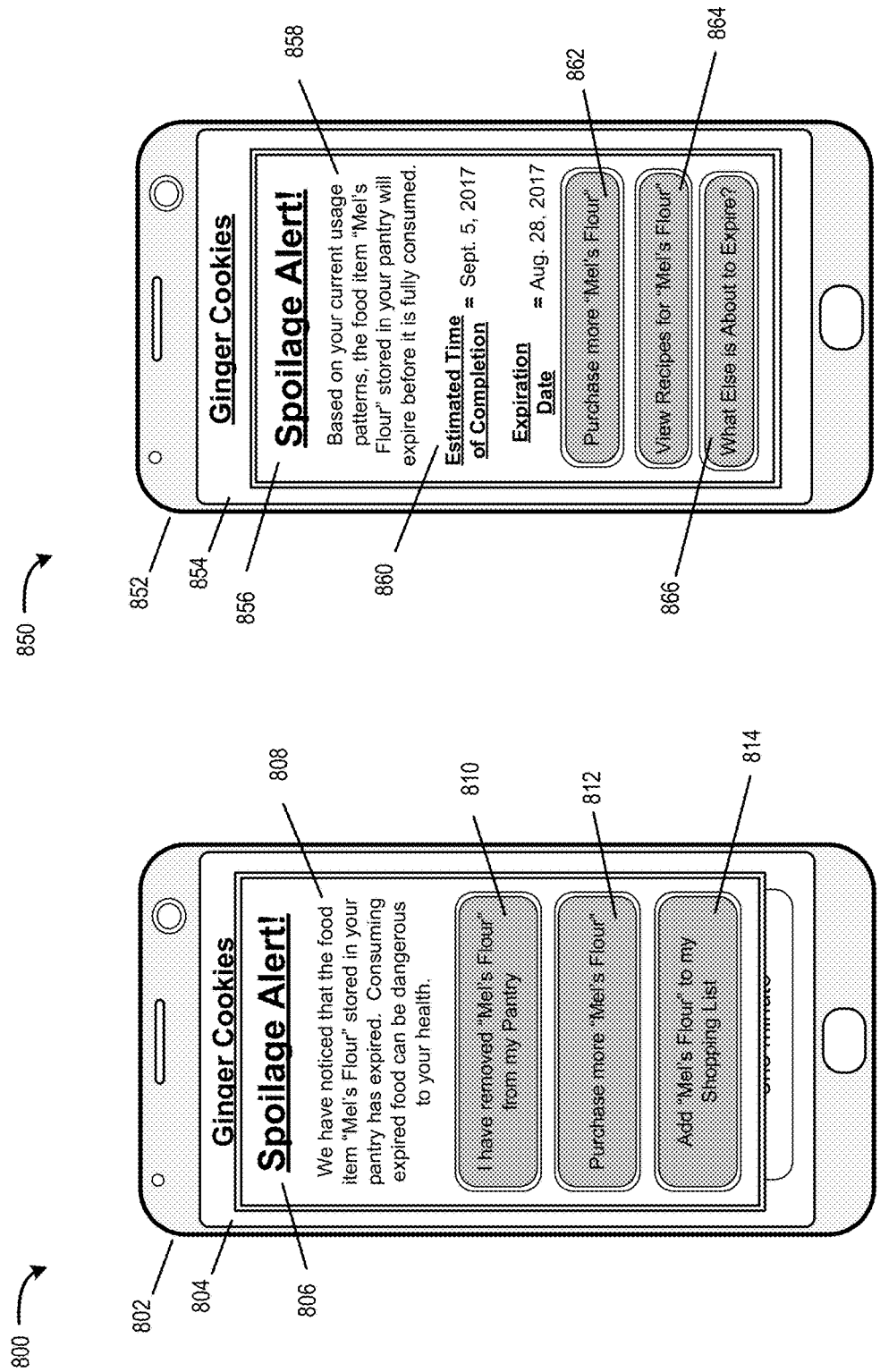

SYSTEM FOR SMART SPOILAGE ALERTS

BACKGROUND

At any given time, most households store large quantities of food items. Due to the quantity of food that is stored, it is often difficult for people to know what food items they have on hand, what foods have expired, what foods are going to expire before they are fully consumed, etc. This lack of awareness of the status and/or quantity of stored food items means that a large amount of purchased food goes to waste. Accordingly, there is a need for a system that allows users to more easily track and monitor the food items that they have on hand, to provide notifications of expiring food items, and assist users in selecting recipes that use food items that are about to expire.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is an example illustration of a data store that maintains food item information for food items in a pantry.

FIGS. 7A and 7B are example illustrations of a user computing device and an appliance configured to capture verification data to corroborate consumption events.

FIGS. 8A and 8B are example illustrations of user computing devices displaying notifications that a food item has expired and is going to expire, respectively.

DETAILED DESCRIPTION

Figure 1:
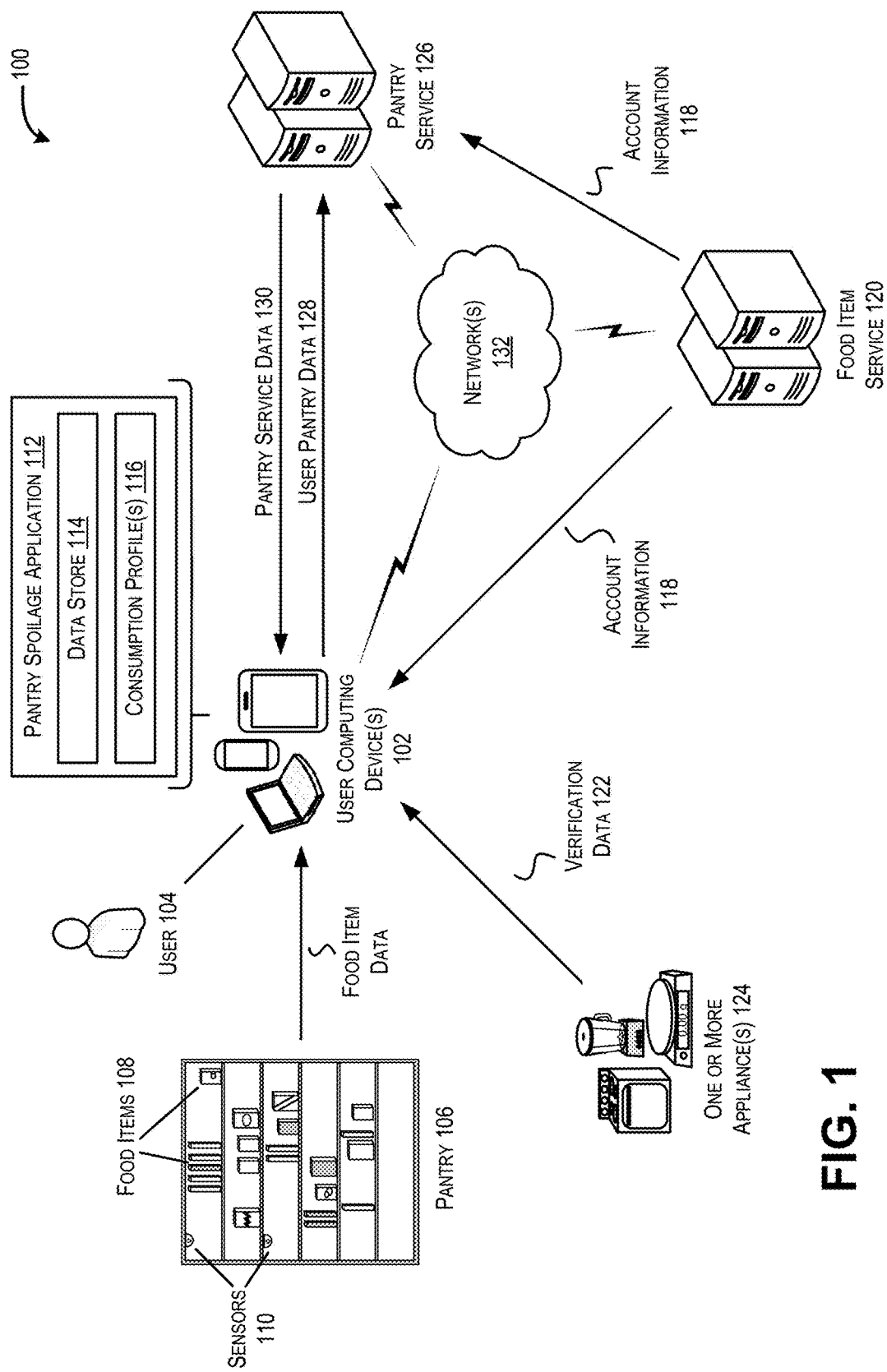
FIG. 1 is an illustrative environment for determining food items are about to expire and providing alerts to users.

This disclosure is generally directed to a smart pantry system that is able to determine when a food item stored in a pantry of a user has expired or is about to expire. The system may also predict an estimated time at which a food item is going to be fully consumed, and then provide alerts and/or recipe recommendations to assist the user in consuming the food item before its expiration date. A food item may include any item of food or drink, including raw ingredients (e.g., eggs, butter, oats, milk, olive oil, carrots, gin, chicken breast, etc.), and prepared ingredients (e.g., ice cream, butter, pasta sauce, sangria, potato salad, etc.).

In some embodiments, the system may estimate the time at which the food item is going to be fully consumed based on verified consumption events of the food item. A consumption event corresponds to an instance where a corresponding good is used, eaten, or otherwise consumed. Example consumption events may include eating a portion of a food item, adding a portion of the food item during the completion of a recipe, etc. A verified consumption event corresponds to a consumption event for which the smart pantry system has obtained corroborating data that verifies the consumption of the food item. For example, a verified consumption event may be corroborated in light of corroborated point of consumption (POC) data.

The smart pantry system may maintain a data store that contains information associated with one or more food items stored in the smart pantry system, such as names of food items, brands of food items, number of units of food items, quantity of food items, expiration dates, dates that food items were purchased, nutrition information, consumption profiles, etc. A consumption profile for a food item may include information describing individual consumption events associated with the food item (instances of usage of the food item that are captured by the smart pantry system), times of consumption events, schedule of consumption of a food item, amount of the food item consumed before expiration, etc.

The smart pantry system may include one or more electronic pantry devices for tracking the food items that a user has on hand, such as smart storage spaces, appliances, computing devices associated with a pantry spoilage application, etc. Smart storage spaces may include cabinets, shelving, or other storage resources that include one or more sensors for monitoring food items contained therein. An appliance may include a scale, oven, blender, mixer, refrigerator, food thermometer, or other type of tool used to store and/or prepare food. In some embodiments, the computing device may be integrated into one or more of the appliances. For example, a kitchen appliance (i.e., refrigerator, blender, oven, etc.) may include a memory and processors that enable the kitchen appliance to present a graphical smart pantry interface on a display.

A pantry spoilage application may include software that enables a computing device to maintain and update a data store of food item information. The pantry spoilage application may be run on a computing device associated with a user, such as a smartphone, tablet, personal computer, laptop, voice controlled computing device, server system, or other computing system that is able to execute and/or present one or more functionalities associated with the pantry spoilage application.

In some embodiments, the pantry spoilage application may use pantry data to build a data store and/or consumption profiles associated with food items that are stored in an associated smart pantry. For example, pantry data may be manually entered into the pantry spoilage application, may be acquired by scanning food items (e.g., bar code scan, QR code scan, RFID tag scan, photograph of food item packaging, etc.) with one or more sensors, photographing or scanning receipts of food items purchased from a vendor, or reading sensor data detected by one or more sensors in a smart storage space. Alternatively, or in addition, the pantry spoilage application may build a data store and/or consumption profiles using information associated with one or more user accounts, such as grocery store membership accounts, an account with a shopping list application, accounts associated with electronic shopping services, credit card accounts, or other user accounts that may provide information relating to food items purchased or otherwise acquired by a user.

In some embodiments, a pantry spoilage application may build or update a data store and/or consumption profiles using information associated with consumption by a user. For example, a pantry spoilage application may add food item information that corresponds to ingredients of a recipe that a user has indicated that he or she made.

Alternatively, or in addition, a pantry spoilage application may build or otherwise update a data store and/or consumption profiles using POC data that verifies consumption of a food item based on recipe data and corresponding sensor data. For example, a computing device may include a POC application that provides one or more recipe functionalities associated with a recipe. A recipe may include a set of instructions for preparing a particular food or drink item in the form of a sequence of recipe steps. The recipe steps may include one or more actions performed during preparation of a recipe (e.g., adding an ingredient to a container, turning on a blender, preheating an oven, etc.). The recipe functionalities may include a graphical recipe interface, a series of visual and/or audio signals for guiding a user through a recipe, or a combination thereof. For example, the application may present a graphical recipe interface that includes a recipe step that a certain amount of an ingredient is to be added to a container that is on a kitchen scale.

The appliances may include one or more components that detect and provide information associated with recipe steps to the recipe application. For example, the recipe application may direct a user to place a container on the kitchen scale, and add a first ingredient to the container. A kitchen scale may then detect that the container has been placed onto the scale, and/or detect a change in the mass of the container. This may involve a first detection that the mass of the container is increasing, and a second detection that the mass of the container has become stable (i.e., the mass has not changed more than a threshold amount for a period of time). The kitchen scale may then provide information data associated with the addition of the ingredient to the recipe application via a wired or wireless connection.

A POC application may receive information data, verify that the information matches expected information for an ingredient of the recipe, and then generate verified POC data associated with the ingredient. In some embodiments, generating the verified POC data may include causing a pantry spoilage application to update a data store to reflect the POC application verifying that the consumer has the ingredient on hand. For example, based on a POC application verifying that a user has added flour to a recipe, a pantry spoilage application may update a data store to include food item information corresponding to flour. Alternatively, or in addition, a pantry spoilage application may update a data store to reflect verification of the user adding the ingredient. For example, based on a POC application verifying that a user has added two eggs to a container, a pantry spoilage application may update a data store to reflect that the user's pantry has two less eggs. In some embodiments, a POC application and a pantry spoilage application may be a single application.

In some embodiments, a pantry spoilage application may be able to provide spoilage alerts to a user based on a data store and/or consumption profiles. For example, a pantry spoilage application may provide one or more notifications that an expiration data associated with a food item is approaching and/or has passed. In some embodiments, notifications may include recipes that would consume remaining portions of a food item that is about to expire, a selectable option for obtaining an additional amount of the food item (e.g., adding the food item to a shopping list, acquiring the food item from an online marketplace/grocery service, etc.), or both.

A pantry spoilage application may generate, based on a data store and/or a consumption profile associated with a food item, an estimated time at which a food item will be fully consumed. For example, based on one or more consumption events captured in a food item's consumption profile, a pantry spoilage application may predict a rate of future consumption of the food item. In some embodiments, a pantry spoilage application may compare the estimated time that a food item will be fully consumed to an expiration date associated with the food item to determine whether the food item is likely to expire before it is fully consumed. If the pantry spoilage application determines that the food item is likely to expire, the pantry spoilage application may provide a notification to the user that the food item is going to expire before it is fully consumed, recommend recipes that include the food item to expedite consumption of the food item, or both. In some embodiments, a pantry spoilage application may provide a selection of one or more recipes that require food items that the data store and/or consumption profiles indicate are about to expire.

The techniques, apparatuses, and systems described herein may be implemented in a number of ways. Example implementations are provided below with reference to the following figures.

FIG. 1 is a schematic diagram of an illustrative environment 100 for determining food items are about to expire and providing alerts to users. The environment 100 includes a user computing device 102, and a user 104 associated with user computing device 102. User computing device 102 may include any type of device such as a laptop computer, personal computer, voice controlled computing device, a tablet device, a mobile telephone, etc. Any such device may include one or more processor(s), computer-readable media, speakers, a display, etc. Environment 100 may also include one or more electronic pantry devices for tracking the food items 108 that user 104 has on hand, such as smart storage spaces (e.g., pantry 106), appliances (e.g., appliances 124), computing devices associated with a pantry spoilage application 112 (e.g., user computing device 102), etc.

Pantry 106 may include one or more storage spaces for storing food items 108 (e.g., cabinets, shelving, refrigerators, freezers, or other storage resources). Food items 108 may include any item of food or drink, including raw ingredients (e.g., eggs, butter, oats, milk, olive oil, carrots, gin, chicken breast, etc.), and prepared ingredients (e.g., ice cream, butter, pasta sauce, sangria, potato salad, etc.). In some embodiments, one or more of the storages spaces of pantry 106 may include one or more sensors 110 for monitoring food items 108 contained therein. For example, pantry 106 may include one or more sensors that can scan or otherwise detect food items 108 stored within it, detect an amount of mass associated with one or more food items 108, etc.

FIG. 1 further depicts user computing devices 102 as including pantry spoilage application 112 that enables one or more of the computing devices 102 to utilize food item data to generate and maintain a data store 114 of food items 108 stored in pantry 106. A pantry spoilage application 112 may also store one or more consumption profiles 116, where individual consumption profiles 116 are associated with a corresponding food item 108. In some embodiments, consumption profiles 116 may be included within data store 114. In some embodiments, data store 114 and/or consumption profiles 116 may be generated and maintained by a smart pantry application associated with pantry spoilage application 112.

Food item data may be information relating to one or more food items 108 such as types of food items 108, brands of food items 108, numbers of units of food items 108, quantity of food items 108, expiration dates, dates of purchase, nutrition information, etc. Data store 114 may be a database that contains food item data associated with the food items 108 stored in pantry 106. For example, data store 114 may identify a collection of food items 108 that are stored in pantry 106. Additionally, data store 114 may store information associated with the individual food items 108, such as nutritional information; brand information; food types; flavors; quantities/amounts of individual food items 108 stored in pantry 106 (e.g., 2 boxes of ramen, 1.3 lbs. of sugar, 3.5 oz. of olive oil, etc.); dates individual food items 108 were purchased; expiration data associated with individual food items 108; and/or other information.

A consumption profile 116 may be a collection of data associated with one or more food items 108, which may include information such as the name of the food item 108, size of the food item 108, statistics describing individual consumption events associated with the food item 108 (i.e., instances of usage of the food item 108 captured by the consumption capture system), times of consumption events, timetable of consumption of a food item 108, amount of the food item 108 consumed before expiration, etc. In some embodiments, a consumption profile 116 may correspond to an individual data file. Alternatively, more than one consumption profiles 116 may be stored within a single data file. For example, user computing device 102 may store a data file on the memory that contains consumption information for user 104, including the food items 108 stored in the user's pantry 106, a log of consumption events for individual food items 108, a current status of individual food items 108 in the pantry 106 (i.e., amount left, time to expiration, etc.), and/or other information.

In some embodiments, food item data may be manually entered into pantry spoilage application 112 via user computing device(s) 102, may be acquired by scanning food items 108 (e.g., bar code scan, QR code scan, RFID tag scan, photograph of food item packaging, etc.), photographing/scanning receipts of food items 108 purchased from a vendor, via sensor data from one or more sensors in a smart storage space. For example, a user may take a picture of a shopping receipt using a user computing device 102 (or another device), and pantry spoilage application 112 may identify food items 108 that the shopping receipt indicates the user purchased or otherwise obtained. In another example, the user 104 may use user computing device 102 or another device to take a picture of a bar code or the packaging of a can of creamed corn, and pantry spoilage application 112 may then utilize a bar code identifier to update a data store 114 to reflect that one can of creamed corn has been added to pantry 106.

Pantry spoilage application 112 may also receive food item data via account information 118 associated with one or more user accounts, such as grocery store membership accounts, an account with a shopping list application, accounts associated with electronic shopping services, credit card accounts, or other user accounts that may provide information relating to food items 108 purchased or otherwise acquired by an individual. Pantry spoilage application 112 may receive the account information from a food item service 120. Food item service 120 may be any entity, server(s), platform, etc. Food item service 120 may be associated with an electronic recipe marketplace (e.g., a website, electronic application, widget, etc.) that allows users to search, browse, view and/or acquire (i.e., purchase, rent, lease, borrow, download, etc.) food items 108, may be associated with physical locations where users may purchase food items 108 (e.g., grocery store member service), may be associated with entities that facilitate payment and/or acquisition of food items 108 (e.g., payment services, bank services, shipment services, etc.), or a combination thereof. Food item service 120 may store account information 118 for one or more users are associated with food item service 120. Account information 118 may include information corresponding to food items 108 purchased by users 104 (e.g., names of food items 108, brands of food items 108, number of units of food items 108, quantity of food items 108, expiration dates, dates that food items 108 were purchased, nutrition information, etc.). For example, pantry spoilage application 112 may receive account information from a grocery store membership service that indicates food items 108 that were purchased by user 104. Alternatively, or in addition, pantry spoilage application 112 may receive account information 118 from an application executing on user computing device 102 and associated with food item service 120.

In some embodiments, pantry spoilage application 112 may build or update data store 114 using information associated with consumption by user 104. For example, pantry spoilage application 112 may update data store 114 to include food items 108 that correspond to ingredients of a recipe that user 104 indicates he or she have made. Alternatively, or in addition, pantry spoilage application 112 may build or otherwise update data store 114 using point of consumption (POC) data that verifies the consumption of a food item 108, and which is generated based on recipe data and corroborating verification data 122 received from one or more appliances 124. The POC data may be generated by pantry spoilage application 112, a POC application, or a combination thereof. A POC application may be an application for presenting a graphical recipe interface and/or series of visual and/or audio signals that guide user 104 through the process of making a recipe, and generating verified consumption data based on verification data 122 received from appliances 124. For example, for individual steps of a recipe, a POC application may cause user computing device 102 to present an audio instruction to perform the step. In some embodiments, when a recipe step is associated with appliance 124, a POC application may also cause appliance 124 to present an audio or visual signal to draw the attention of the individual to an aspect of the appliance 124 such as to a container on a kitchen scale. For example, a POC application may cause user computing device 102 to transmit a signal to appliance 124 that an audio or video signal is to be provided.

A recipe may include a set of instructional recipe steps for preparing a particular food or drink item. The recipe steps may include one or more actions performed during preparation of a recipe (e.g., adding an ingredient to a container, turning on a blender, preheating an oven, etc.). Appliances 124 may include one or more components that detect evidence of recipe actions, and provide verification data 122 associated with the recipe actions to user computing device 102. The recipe actions may include one or more actions performed during preparation of a recipe, such as adding an ingredient to a container; turning on a blender; preheating an oven; or inputting commands to a slow cooker, oven, or microwave oven (e.g., setting an oven to broil, setting a burner to medium, programming a microwave to cook for 2 minutes, etc.) Detection of completion of a recipe action may occur for example by a refrigerator or cabinet detecting that an ingredient has been removed and/or replaced with a reduced quantity (e.g., removed a bunch of 7 bananas, returned a bunch of 4 bananas), a thermometer indicating that a goal temperature has been achieved, etc.

In some embodiments, verification data 122 may correspond to sensor data from one or more sensors located within appliance 124. For example, a blender may be capable of sensing when a container is placed on the blender, or detect a change in mass that occurs when a user 104 adds an ingredient to the blending container. Verification data 122 may also correspond to information provided by user 104 via a gesture, voice command, a physical interface, a graphical user interface, etc. Verification data 122 may correspond to one or more sounds picked up by a microphone element associated with user computing device 102, appliances 124, or another device. The sounds may be indicative of a recipe action having been performed such as the sound of a blender running; a stand mixer mixing; a food processor chopping; a cabinet, refrigerator, oven, or microwave door being opened/closed; an alarm going off (e.g., microwave notification, timer alarm, oven notification that preheat is finished, etc.); the crack of an eggshell being broken; the hiss of a champagne bottle being opened; or similar.

The POC application may then receive verification data 122 corresponding to a recipe ingredient. The verification data 122 may be transmitted from appliance 124 to user computing device 102 via a wired or wireless connection. In some embodiments, where user computing device 102 is integrated into appliance 124, the verification data may be passed between one or more sensors of the appliance and the POC application via one or more internal connections. For example, where appliance 124 is a kitchen scale and user 104 adds an ingredient to a container placed upon the kitchen scale, appliance 124 may detect a change in mass of the container and transmit verification data corresponding to the change of mass to the POC application. In another example, for a smoothie recipe the final recipe step may be to cause a kitchen blender appliance to blend the ingredients in a container. When user 104 presses a button to cause the kitchen blender appliance to initiate blending, the kitchen blender appliance may transmit verification data 122 that indicates that the user 104 has initiated blending.

A POC application may generate consumption data based the POC application determining that verification data 112 received from appliances 124 corroborates that a consumption event has occurred (i.e., an instance where a corresponding good was used, eaten, or otherwise consumed, etc.). For example, once a POC application causes a recipe step to be presented to user 104, the POC application may wait for verification data 122 corresponding to the recipe step. The POC application may then verify that the ingredient has been added. Verifying that the ingredient has been added may include comparing the sensor data included in verification data 122 to expected sensor information for the ingredient. For example, a POC application may know a change in mass that is to be expected when one cup of flour is added to a container, and may compare verification data 122 to the expected mass. If verification data 122 is within a threshold range of similarity (e.g., plus or minus a threshold percentage, a threshold numerical amount, etc.), then the POC application may verify the consumption event as having occurred (i.e., verify that the ingredient has been added). If verification data 122 is outside the threshold range, and is indicative of a mistake (i.e., user 104 added too much or too little of an ingredient) the POC application may provide an alert to the user 104 that there has been a mistake, and/or take action to adjust the recipe (e.g., adjust the proportions of other ingredients within the recipe to compensate for the mistake). If verification data 122 is outside the threshold range the POC application may check to see if the verification data 122 matches an alternative ingredient (i.e., a substitution, a different ingredient in the recipe, etc.), and/or prompt user 104 to add a new ingredient.

Once a POC application verifies the consumption event, the POC application may generate consumption data for a verified ingredient. The consumption data may identify the ingredient, an amount added, one or more times related to the pour event (e.g., time the pour started, time the pour finished, duration of the pour event, etc.), nutritional information for the poured ingredient, a brand or other identifier associated with the ingredient, a user identifier associated with the individual preparing the recipe, an indication that the ingredient was verified by information from the appliance, etc. The consumption data may correspond to the actual amount indicated in the verification data 122. For example, if the recipe calls for 33 g of butter to be added, but the verification data indicates that 35.7 g of butter was added to a recipe, the POC application may generate consumption information for 35.7 g of butter. Once the POC application verifies that the ingredient has been added, the POC application may cause another ingredient for the recipe to be presented.

In some embodiments, a POC application may track ingredients that a user 104 has added without interacting with an appliance 124. For example, a POC application may receive audio input from a user 104 that an ingredient has been added. The POC application may then verify that the ingredient has been added based on the audio input. A POC application may also receive an input of one or more ingredients that have been added without use of an appliance 124 via a graphical interface.

A POC application may identify that a recipe has been completed without verifying each individual ingredient of the recipe. For example, a POC application may determine that a recipe is complete when a threshold amount of the recipe is completed. In various embodiments, the threshold amount may correspond to a number of verified ingredients added, or a percentage of ingredients being verified. A POC application may determine that a recipe is complete based on input from user 104 (e.g., via a gesture, voice command, a physical interface, a graphical user interface, etc.) or based on other verification data 122. For example, where the final step of a cookie recipe is to bake the cookies, a POC application may determine that all ingredients have been added when an oven appliance sends verification data 122 that the oven has been set to preheat to the correct temperature. The POC application may then verify that all ingredients have been added, and generate consumption data for all of the remaining unverified ingredients in the cookie recipe. Alternatively, or in addition, in response to the oven being preheated, a POC application may prompt user 104 to indicate (via a gesture, voice command, a physical interface, a graphical user interface, etc.) what additional unverified ingredients have been added.

A POC application may transmit generated consumption data to pantry spoilage application 112. The consumption data may be transmitted from the POC application to pantry spoilage application 112 executing on user computing device 102 via a wired or wireless connection. In some embodiments, where a POC application and pantry spoilage application 112 are executing on the same user computing device 102, generated consumption data may be passed to pantry spoilage application 112 via one or more internal connections. In some embodiments, pantry spoilage application 112 and a POC application may be a single application.

Pantry spoilage application 112 may generate and/or update data store 114 based on consumption data to reflect a POC application verifying that user 104 has an ingredient (i.e., food item 108) on hand. For example, based on a POC application verifying that a user 104 has added balsamic vinegar to a recipe, pantry spoilage application 112 may update the data store 114 so that it indicates that food item 108 "balsamic vinegar" is stored in pantry 106. Alternatively, or in addition, pantry spoilage application 112 may update data store 114 to reflect verification of a user 104 adding an ingredient. For example, based on a POC application verifying that a user 104 has added two cups of coconut milk to a container, pantry spoilage application 112 may update data store 114 by reducing the quantity of the food item 108 "coconut milk" by two cups. In this way, as a POC application determines that an individual food item 108 is consumed by user 104 and/or an amount of the individual food item 108 that is consumed, pantry spoilage application 112 updates data store 114 so that it reflects the current state of items 108 stored in pantry 106.

Alternatively, or in addition, pantry spoilage application 112 may generate and/or update one or more consumption profiles 116 based on consumption data to reflect a POC application verifying that user 104 has an ingredient on hand. For example, based on a POC application verifying that a user 104 has added two eggs to a recipe, pantry spoilage application 112 may generate a consumption profile 116 for a carton of eggs that indicates that the user 104 obtained the carton of eggs, and that a consumption event in which two eggs were consumed was verified by verification data. Alternatively, or in addition, pantry spoilage application 112 may update a previously existing consumption profile 116 associated with a carton of eggs to reflect the verification of the consumption event where two eggs were consumed. In this way, as a POC application determines that an individual food item 108 is consumed by user 104 and/or an amount of the individual food item 108 that is consumed, pantry spoilage application 112 updates the corresponding consumption profile 116 so that it contains data memorializing the history of consumption events associated with the food item 108.

Pantry spoilage application 112 provide spoilage alerts to user 104 based on data store 114 and/or consumption profiles 116. For example, pantry spoilage application 112 may provide one or more notifications that an expiration data associated with a food item 108 is approaching and/or has passed. In some embodiments, notifications may include recipes that would consume remaining portions of a food item 108 that is about to expire, a selectable option for obtaining an additional amount of the food item 108 (e.g., adding the food item 108 to a shopping list, acquiring the food item 108 from an online marketplace/grocery service, etc.), or both.

Pantry spoilage application 112 may also generate, based on data store 114 and/or a consumption profile 116 associated with a food item 108, an estimated time at which a food item 108 will be fully consumed. For example, based on one or more consumption events captured in a food item's 108 consumption profile 116, pantry spoilage application 112 may predict a rate of future consumption of the food item 108. In some embodiments, pantry spoilage application 112 may compare the estimated time that a food item 108 will be fully consumed to an expiration date associated with the food item 108 to determine whether the food item 108 is likely to expire before it is fully consumed. If pantry spoilage application 112 determines that a food item 108 is likely to expire, pantry spoilage application 112 may provide a notification to the user 104 that the food item 108 is going to expire before it is fully consumed, recommend recipes that include the food item 108 to expedite consumption of the food item 108, or both. In some embodiments, pantry spoilage application 112 may provide a selection of one or more recipes that require food items 108 that data store 114 and/or consumption profiles 116 indicate are about to expire.

In some embodiments, pantry spoilage application 112 may be able to present an interface for user 104 to search for, select, and/or view recipes, food items 108 stored in the pantry 106, or a combination thereof. In some embodiments, an interface may allow user 104 to browse information relating to the food items 108 stored in the pantry 106, such as information stored in data store 114, consumption profile(s) 116, or both. Pantry spoilage application 112 may allow a user 104 to restrict a recipe search so as to only include recipes that the user 104 can make with the food items 108 that are about to expire and/or are likely to expire before they are fully consumed. An interface may present indications and/or notifications relating to whether or not food items 108 required to make a recipe are stored in the pantry 106. In some embodiments, when data store 114 indicates that one or more food item 108 which are required for a recipe that user 104 has selected is not stored in pantry 106, an interface may present one or more functionalities for acquiring the required food item(s) 108, such a selectable element for generating a shopping list that includes the required food item(s) 108; adding the required food item(s) 108 to an existing shopping list; purchasing the required food item(s) 108 via a food item service 120, etc.

FIG. 1 further depicts environment 100 including pantry service 126. Pantry service 126 may be any entity, server(s), platform, etc. Pantry spoilage application 112 may share user pantry data 128 with the pantry service. User pantry data 128 may correspond to information associated with portions of/and or all of data store 114 and consumption profiles 116. Pantry service 126 may provide one or more functionalities associated with pantry spoilage application 112, such as providing notifications of food item alerts (i.e., expiration, item recalls, price changes, etc.), storage of recipe data corresponding to one or more recipes, storage of user consumption data, etc. In some embodiments, pantry service 126 may be associated with an electronic recipe marketplace (e.g., a website, electronic application, widget, etc.) that allows users 104 to search, browse, view and/or acquire (i.e., purchase, rent, lease, borrow, download, etc.) recipes. In some embodiments, pantry service 126 may receive recipe data corresponding to one or more recipes from user computing devices, other user computing devices, or a combination thereof.

In some embodiments, pantry service 126 may receive account information 118 from food item service 120. Pantry service 126 may then provide pantry service data 130 to user computing device 102. Pantry service data 130 may include notifications of food item alerts (i.e., expiration, item recalls, price changes, etc.), recipe data corresponding to one or more recipes, account information 118, or a combination thereof. FIG. 1 further illustrates each of user computing device 102, food item service 120, and pantry service 126 as being connected to a network 132.

Figure 2:
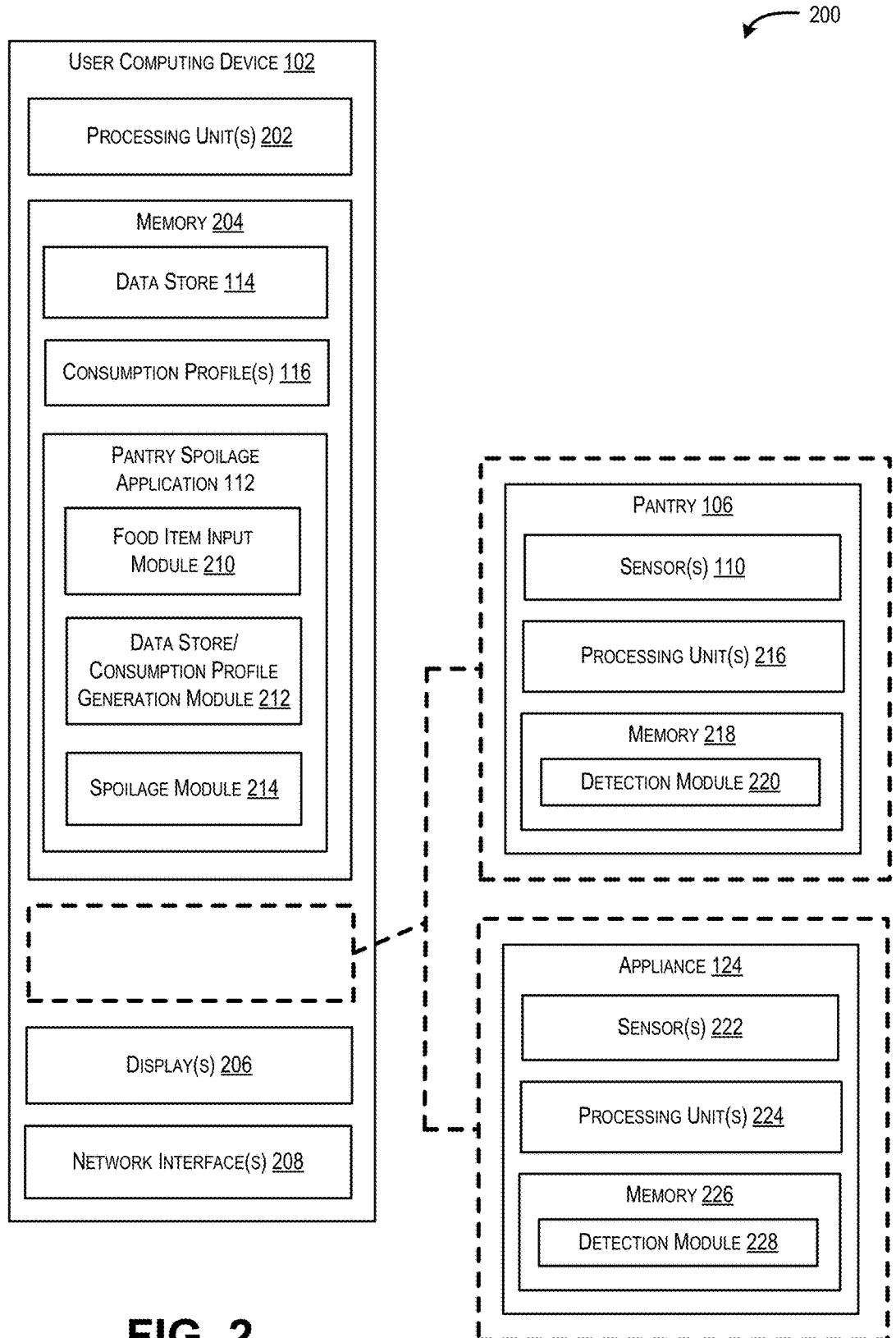
FIG. 2 is an illustrative computing architecture of a computing device configured to provide spoilage alerts for food items stored in a pantry.

FIG. 2 is an illustrative computing architecture 200 of a computing device configured to provide spoilage alerts for food items 108 stored in a pantry 106. The computing architecture 200 may be used to implement the various systems, devices, and techniques discussed herein. In various embodiments, user computing device 102 may be implemented on any type of device, such as a laptop computer, personal computer, voice controlled computing device a tablet device, a mobile telephone, etc.

In the illustrated implementation, the computing architecture 200 includes one or more processing units 202 coupled to a memory 204. The computing architecture may also include a display 206 and/or network interface 208. FIG. 2 further illustrates pantry 106 and appliance 124 as being separate from user computing device 102. However, in some embodiments, one or more of pantry 106 and appliance 124 may be incorporated as a component of user computing device 102, or vice versa.

User computing device 102 can include a data store 114 and one or more consumption profiles 116 stored on a memory 204. Data store 114 may be a database that contains food item data associated with the food items 108 stored in pantry 106. For example, data store 114 may identify a collection of food items 108 that are stored in pantry 106. Additionally, data store 114 may store information associated with the individual food items 108, such as nutritional information; brand information; food types; flavors; quantities/amounts of individual food items 108 stored in pantry 106 (e.g., 2 boxes of ramen, 1.3 lbs. of sugar, 3.5 oz. of olive oil, etc.); dates individual food items 108 were purchased; expiration data associated with individual food items 108; and/or other information.

A consumption profile 116 may be a collection of data associated with one or more food items 108, which may include information such as the name of the food item 108, size of the food item 108, statistics describing individual consumption events associated with the food item 108 (i.e., instances of usage of the food item captured by the consumption capture system), times of consumption events, timetable of consumption of a food item 108, amount of the food item 108 consumed before expiration, etc. In some embodiments, a consumption profile 116 may correspond to an individual data file. Alternatively, more than one consumption profiles 116 may be stored within a single data file. For example, user computing device 102 may store a data file on memory 204 that contains consumption information for user 104, including the food items 108 stored in the user's 104 pantry 106, a log of consumption events for individual food items 108, a current status of individual food items 108 in the pantry 106 (i.e., amount left, time to expiration, etc.), and/or other information.

Food item data may be information relating to one or more food items 108 such as types of food items 108, brands of food items 108, a location of individual food items 108 in pantry 106, numbers of units of food items 108, quantity of food items 108, expiration dates, dates of purchase, nutrition information, etc. Food items 108 may include any item of food or drink, including raw ingredients (e.g., eggs, butter, oats, milk, olive oil, carrots, gin, chicken breast, etc.), and prepared ingredients (e.g., ice cream, butter, pasta sauce, sangria, potato salad, etc.).

User computing device 102 can include a pantry spoilage application 112 stored on memory 204. Pantry spoilage application 112 may be configured to receive and/or otherwise determine food item data, and generate and maintain data store 114 and/or consumption profile(s) 116 for food items 108 stored in pantry 106 based on the food item data.

Pantry spoilage application 112 may include food item input module 210, data store/consumption profile generation module 212, and spoilage module 214. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with user computing device 102 can be executed across multiple devices.

Food item input module 210 can be executable by the one or more processing units 202 to receive user input, sensor data, verification data, etc., and generate food item data associated with pantry 106. In some embodiments, food item data may be manually entered by a user 104 via one or more interfaces associated with user computing device 102 or pantry 106. For example, food item input module 210 may present on display 206 a graphical user interface that presents functionality that allows a user 104 to selectively input the food items 108 that the user 104 is storing in the pantry 106.

Alternatively, or in addition, food item input module 210 may generate food item data based on sensor data received via sensors associated with user computing device 102 or pantry 106. For example, a user 104 may scan food items 108 with a sensor (e.g., bar code scan, QR code scan, RFID tag scan, photograph of food item packaging, etc.) independent from, or incorporated into user computing device 102 and/or pantry 106, which may be used by food item input module 210 to generate food item data. In another example, a user 104 may photograph or otherwise scan receipts of food items 108 purchased from a vendor. Food item input module 210 may then identify a set of food items 108 that the shopping receipt indicates the user 104 purchased, and generate food item data for the set of food items 108.

Alternatively, or in addition, food item input module 210 may generate food item data based on sensor data received via one or more sensors 110 in pantry 106. For example, sensor(s) 110 may detect images of food items 108 stored in pantry 106, detect RFID signal from food items 108 stored in pantry 106, etc. Sensor(s) 110 may also detect changes in mass, size, and/or volume of food items 108 stored in the pantry 106 over a period of time.

Food item input module 210 may generate food item data based on account information associated with one or more user accounts, such as grocery store membership accounts, an account with a shopping list application, accounts associated with electronic shopping services, credit card accounts, or other user accounts that may provide information relating to food items 108 purchased or otherwise acquired by an individual. Food item input module 210 may receive account information from a food item service, such as an electronic recipe marketplace (e.g., a website, electronic application, widget, etc.) that allows users 104 to search, browse, view and/or acquire (i.e., purchase, rent, lease, borrow, download, etc.) food items 108; a store having physical locations where users 104 may purchase food items 108 (e.g., grocery store member service); entities that facilitate payment and/or acquisition of food items 108 (e.g., payment services, bank services, shipment services, etc.); or a combination thereof. For example, food item input module 210 may receive account information from a payment service that indicates a set of food items 108 that were purchased by user 104, and then generate food item data for the set of food items 108. Food item input module 210 may receive account information 118 from a server associated with the food service, a computing device associated with the food service, an application executing on user computing device 102, or a combination thereof.

In some embodiments, food item input module 210 may generate food item data based on food items that a user 104 is known to have consumed and/or otherwise used to make a recipe. For example, food item input module 210 may generate food item data for food items that correspond to ingredients of a recipe that a user 104 indicates he or she made. Alternatively, or in addition, food item input module 210 may generate food item data using point of consumption (POC) data that verifies the consumption of a food item based on recipe data and corroborating verification data 122 received from one or more appliances 124. For example, food item input module 210 may cause user computing device 102 to present a graphical recipe interface and/or series of visual and/or audio signals that guide user 104 through the process of making a recipe. For example, for individual steps of a recipe, user computing device 102 may present a visual or audio instruction to perform the step. A recipe may include a set of instructional recipe steps for preparing a particular food or drink item. The recipe steps may include one or more actions performed during preparation of a recipe (e.g., adding an ingredient to a container, turning on a blender, preheating an oven, etc.). In some embodiments, when a recipe step is associated with appliance 124, appliance 124 to present an audio or visual signal to draw the attention of the individual to an aspect of the appliance 124, for example to a container on a kitchen scale. For example, pantry spoilage application 112 may cause user computing device 102 to transmit a signal to appliance 124 that an audio or video signal is to be provided.

Appliance 124 may include one or more components that detect evidence of recipe actions, and provide verification data associated with the recipe actions to user computing device 102. The recipe actions may include one or more actions performed during preparation of a recipe, such as adding an ingredient to a container; turning on a blender; preheating an oven; inputting commands to a slow cooker, oven, or microwave oven (e.g., setting an oven to broil, setting a burner to medium, programming a microwave to cook for 2 minutes, etc.). Detection of completion of a recipe action may occur for example by a refrigerator or cabinet detecting that an ingredient has been removed and/or replaced with a reduced quantity (e.g., removed a bunch of 7 bananas, returned a bunch of 4 bananas), a thermometer indicating that a goal temperature has been achieved, etc.

Food item input module 210 may generate food item data for a recipe ingredient based on user computing device 102 receiving verification data 122 from an appliance 124 that corresponds to sensor information that is expected for the recipe ingredient. In some embodiments, verification data 122 may correspond to sensor data from one or more sensors 222 located within appliance 124. For example, a blender may be capable of sensing when a container is placed on the blender, or detect a change in mass that occurs when a user 104 adds an ingredient to the blending container. Verification data 122 may correspond to information provided by user 104 via a gesture, voice command, a physical interface, a graphical user interface, etc. Verification data 122 may correspond to one or more sounds indicative of a recipe action having been performed (e.g., sound of a blender running; a stand mixer mixing; a food processor chopping; a cabinet, refrigerator, oven, or microwave door being opened/closed; an alarm going off; microwave notification; oven notification that preheat is finished; the crack of an eggshell being broken; the hiss of a champagne bottle being opened; etc.) that are picked up by a microphone element associated with user computing device 102, appliances 124, or another device.

Verification data 122 may be transmitted from appliance 124 to user computing device 102 via a wired or wireless connection. For example, where appliance 124 is a kitchen scale and user 104 adds an ingredient to a container placed upon the kitchen scale, appliance 124 may detect a change in mass of the container and transmit verification data corresponding to the change of mass to food item input module 210. In another example, for a bread recipe the final recipe step may be to bake the dough in an oven at a set temperature for a set period of time. When user 104 presses a button to cause an oven appliance to preheat to the set temperature, the oven appliance may transmit verification data that indicates that the user 104 has initiated the baking of the dough. In some embodiments, where user computing device 102 is integrated into appliance 124, verification data 122 may be passed between one or more sensors of the appliance 124 and food item input module 210 via one or more internal connections.

Food item input module 210 may then generate food item data based on verification data 122 received from appliances 124. For example, once food item input module 210 causes a recipe step to be presented to user 104, food item input module 210 may wait for verification data 122 corresponding to the recipe step. Food item input module 210 may then verify that the ingredient has been added, and generate food item data for a food item 108 associated with the ingredient. Verifying that the ingredient has been added may include comparing the sensor data included in the verification data 122 to expected sensor information for the ingredient. For example, food item input module 210 may know a change in mass that is to be expected when two tablespoons of baking soda are added to a container, and may compare verification data 122 to the expected mass. If verification data 122 is within a threshold range of similarity (e.g., plus or minus a threshold percentage, a threshold numerical amount, etc.), then food item input module 210 may verify that the ingredient has been added, and generate food item data for the ingredient.

If verification data 122 is outside the threshold range, and is indicative of a mistake (i.e., user 104 added too much or too little of an ingredient) food item input module 210 may provide an alert to user 104 that there has been a mistake, and/or take action to adjust the recipe (e.g., adjust the proportions of other ingredients within the recipe to compensate for the mistake). Alternatively, or in addition, if verification data 122 is outside the threshold range, food item input module 210 may check to see if the verification data 122 matches an alternative ingredient (i.e., a substitution, a different ingredient in the recipe, etc.), and/or prompt user 104 to identify the ingredient that was added. Food item input module 210 may then generate food item data for the alternative ingredient or the ingredient identified by the user 104.

In some embodiments, sensor data, verification data, or user input may include an identifier associated with a food item 108, and generating food item data may include food item input module 210 using the identifier to access item information associated with the food item 108. For example, where food item input module 210 receives data associated with an item barcode information, food item input module 210 may use the barcode information to obtain information corresponding to the food item 108 from a food item resource, such as a locally stored database, a network resource, etc. In another example, where food item input module 210 receives an image of the packaging of a food item 108, food item input module 210 may identify a name, brand, or other identifier of the food item 108 within the image, which food item input module 210 may use to request food item information from a locally stored database, a network resource, etc.

In some embodiments, generating food item data may correspond to food item input module 210 converting sensor data into food item information. For example, food item input module 210 may receive sensor data from a sensor incorporated into a scale that corresponds to an item having a mass of 259 grams being placed on the scale. Food item input module 210 may then generate food item data that corresponds to the item having a mass of 259 g. For example, where food item input module 210 has determined that the item corresponds to the food item 108 "flour," the corresponding food item data may identify that the amount of mass of flour stored in pantry 106 is 259 g, and that this mass corresponds to approximately 2.16 cups of flour.

Data store/consumption profile generation module 212 can be executable by the one or more processing units 202 to generate and/or update data store 114 and consumption profiles 116 associated with pantry 106. Data store/consumption profile generation module 212 may generate data store 114 and consumption profiles 116 based on food item data generated or otherwise received by food item input module 210. Data store 114 may store information associated with the individual food items 108, such as nutritional information; brand information; food types; flavors; state information of individual food items 108 (e.g., quantities/amounts of individual food items 108 stored in pantry 106, dates individual food items 108 were purchased, expiration data associated with individual food items 108, etc.); and/or other information.

Data store/consumption profile generation module 212 may update an existing data store 114 and/or consumption profile 116 based on food item data generated or otherwise received by food item input module 210. For example, based on food item input module 210 verifying a consumption event where a user 104 has added one cup of olive oil to a recipe, data store/consumption profile generation module 212 may update a consumption profile 116 associated with the food item 108 "olive oil" so that it stores data associated with the verified consumption event, such as the amount used, the purpose for the usage, a time of the usage, etc. Alternatively, or in addition, data store/consumption profile generation module 212 may update data store 114 to reflect a user 104 storing a new food item 108 in pantry 106. For example, in response to a user 104 scanning a shopping receipt, data store/consumption profile generation module 212 may update data store 114 to include food item information that corresponds to food items 108 associated with the shopping receipt. In this way, as food item input module 210 generates new food item data, data store/consumption profile generation module 212 updates data store 114 and/or consumption profiles 116 so that they reflect the current state of items stored in pantry 106.

Spoilage module 214 can be executable by the one or more processing units 202 to provide spoilage alerts for food items 108 stored in a pantry 106 based on data store 114 and/or consumption profiles 116. In some embodiments, spoilage module 214 may provide one or more notifications that an expiration data associated with a food item 108 is approaching and/or has passed. In some embodiments, notifications may include recipes that would consume remaining portions of the food item 108 that is about to expire, a selectable option for obtaining an additional amount of the food item 108 (e.g., adding the food item 108 to a shopping list, acquiring the food item 108 from an online marketplace/grocery service, etc.), or both.

Spoilage module 214 may also generate, based on data store 114 and/or a consumption profile 116 associated with a food item 108, an estimated time at which a food item 108 will be fully consumed. For example, based on one or more consumption events captured in a food item's 108 consumption profile 116, spoilage module 214 may predict a rate of future consumption of the food item 108. In some embodiments, spoilage module 214 may compare the estimated time that a food item 108 will be fully consumed to an expiration date associated with the food item 108 to determine whether the food item 108 is likely to expire before it is fully consumed. If spoilage module 214 determines that the food item 108 is likely to expire, spoilage module 214 may provide a notification to the user 104 that the food item 108 is going to expire before it is fully consumed, recommend recipes that include the food item 108 to expedite consumption of the food item 108, or both. In some embodiments, spoilage module 214 may provide a selection of one or more recipes that require food items 108 that the data store 114 and/or consumption profiles 116 indicate are about to expire.

In some embodiments, spoilage module 214 may be able to generate an interface to be displayed on display 206. The interface may present selectable options that enable user 104 to search for, select, and/or view recipes, food items 108 stored in the pantry 106, or a combination thereof. In some embodiments, the interface may allow user 104 to browse information relating to food items 108 stored in the pantry 106, such as information stored in data store 114, consumption profile(s) 116, or both. The interface may allow a user 104 to restrict a recipe search so as to only include recipes that the user 104 can make with food items 108 that are about to expire and/or are likely to expire before they are fully consumed. The interface may also present indications and/or notifications relating to whether or not food items 108 required to make a recipe are stored in the pantry 106. In some embodiments, when data store 114 indicates that one or more food items 108 which are required for a recipe that user 104 has selected are not stored in pantry 106, the interface may present one or more functionalities for acquiring the required food item(s) 108, such a selectable element for generating a shopping list that includes the required food item(s) 108; adding the required food item(s) 108 to an existing shopping list; purchasing the required food item(s) 108 via a food item service 120, etc.

FIG. 2 further depicts pantry 106 and appliance 124. Pantry 106 may include one or more storage spaces for storing food items 108 (e.g., cabinets, shelving, refrigerators, freezers, or other storage resources). In some embodiments, one or more of the storages spaces of pantry 106 may include one or more sensors 110 for monitoring food items 108 contained therein. Sensors 110 may include any combination of one or more optical sensors (e.g., camera, barcode scanner, etc.), pressure sensors (e.g., capacitance sensors, piezoelectric sensors, etc.), acoustic sensors (e.g., microphones, etc.), or other sensors capable of receiving input or other otherwise detecting characteristics of food items 108 in pantry 106 and/or the environment of pantry 106. For example, pantry 106 may include one or more sensors that can capture photographs of the labels and/or packaging of food items 108 stored within the pantry 106. In some embodiments, pantry 106 may further include processing unit(s) 216, and memory 218. The pantry 106 can include a detection module 220 stored on the memory 218.

Detection module 220 can be executable by the one or more processing units 216 to monitor sensor data from sensors 110 and transmit the sensor data to user computing device 102. In some embodiments, detection module 220 may also be configured to generate food item data based on the sensor data, and transmit the food item data to user computing device 102.

Appliance 124 may be a scale, oven, blender, mixer, refrigerator, food thermometer, or other type of tool used to store and/or prepare food. Appliance 124 may include one or more sensors 222 that detect evidence of ingredients being added and/or recipe steps being executed. Sensors 222 may include any combination of one or more optical sensors (e.g., camera, barcode scanner, etc.), pressure sensors (e.g., capacitance sensors, piezoelectric sensors, etc.), acoustic sensors (e.g., microphones, etc.), or other sensors capable of receiving input or other otherwise detecting characteristics of appliance 124 and/or the environment of appliance 124.

In some embodiments, appliance 124 may further include processing unit(s) 224 and memory 226. Appliance 124 can include a detection module 228 stored on the memory 226. Detection module 228 can be executable by the one or more processing units 224 to monitor sensor data from sensors 222 and transmit the sensor data to user computing device 102.

Those skilled in the art will appreciate that the architecture described in association with user computing device 102, pantry 106, and appliance 124 are merely illustrative and is not intended to limit the scope of the present disclosure. In particular, the computing system and devices may include any combination of hardware or software that can perform the indicated functions, including computers, network devices, internet appliances, and/or other computing devices. User computing device 102, pantry 106, and appliance 124 may also be connected to other devices that are not illustrated, or instead may operate as a stand-alone system. In addition, the functionality provided by the illustrated components may in some implementations be combined in fewer components or distributed in additional components. For example, in some embodiments use computing device 102 may be incorporated into pantry 106, appliance 124, or both. Similarly, in some implementations, the functionality of some of the illustrated components may not be provided and/or another additional functionality may be available.

The one or more processing unit(s) 202, 216, and 224 may be configured to execute instructions, applications, or programs stored in the memory(s) 204, 218, and/or 226. In some examples, the one or more processing unit(s) 202, 216, and 224 may include hardware processors that include, without limitation, a hardware central processing unit (CPU), a graphics processing unit (GPU), and so on. While in many instances the techniques are described herein as being performed by the one or more processing unit(s) 202, 216, and 224, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 204, 218, and 226 is an example of computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transmission medium that may be used to store the desired information and which may be accessed by a computing device. In general, computer storage media may include computer-executable instructions that, when executed by one or more processing units, cause various functions and/or operations described herein to be performed.

Additionally, a computer media includes data stored within a modulated data signal. For example, a computer media may include computer readable instructions, data structures, program modules, modulated carrier waves, other modulated transmission mechanisms, etc. However, as defined herein, computer storage media does not include communication media. Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated environment 200. Some or all of the system components or data structures may also be stored (e.g., as instructions or structured data) on a non-transitory, computer-readable or otherwise computer-accessible medium or a portable article to be read by an appropriate drive, various examples of which are described above. In some implementations, instructions stored on a computer-accessible medium separate from user computing device 102, pantry 106, and/or appliance 124 may be transmitted to user computing device 102, pantry 106, and/or appliance 124 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Additionally, the network interface 208 includes physical and/or logical interfaces for connecting the respective computing device(s) to another computing device or network. For example, the network interface 208 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Figure 3:
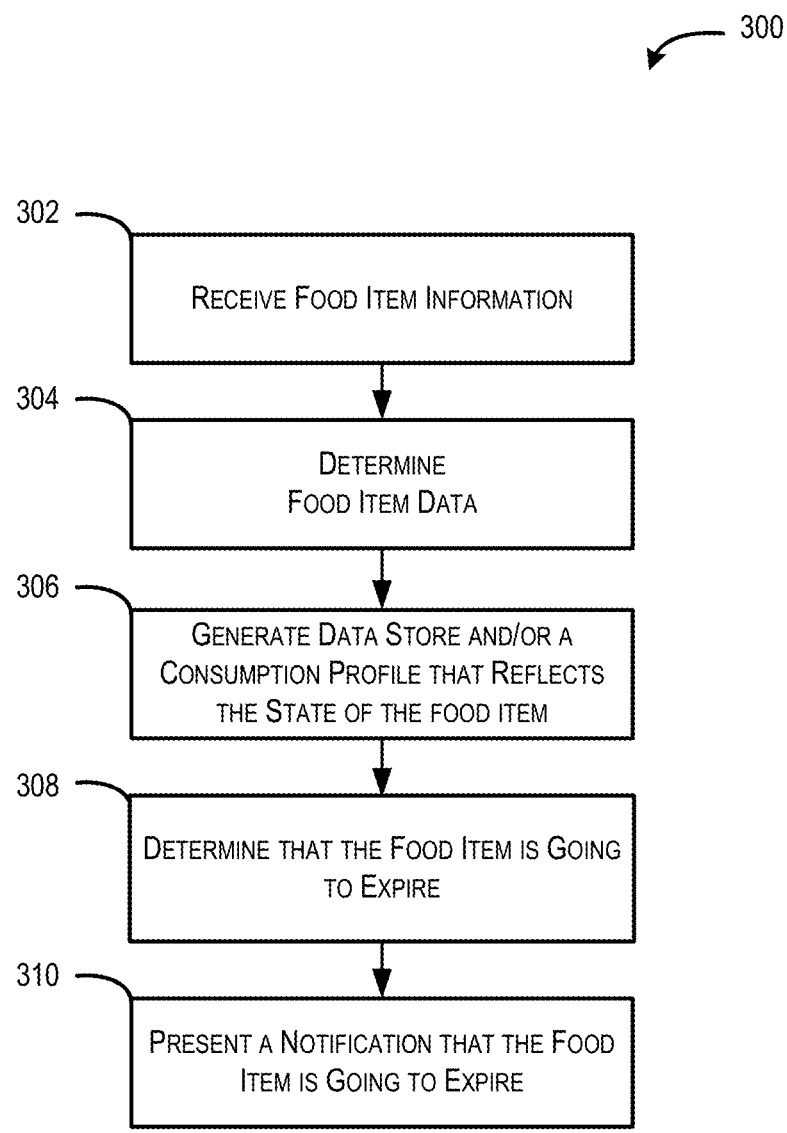
FIG. 3 is a flow diagram of an illustrative process for presenting notifications that food items in a smart pantry are going to expire.
Figure 6:
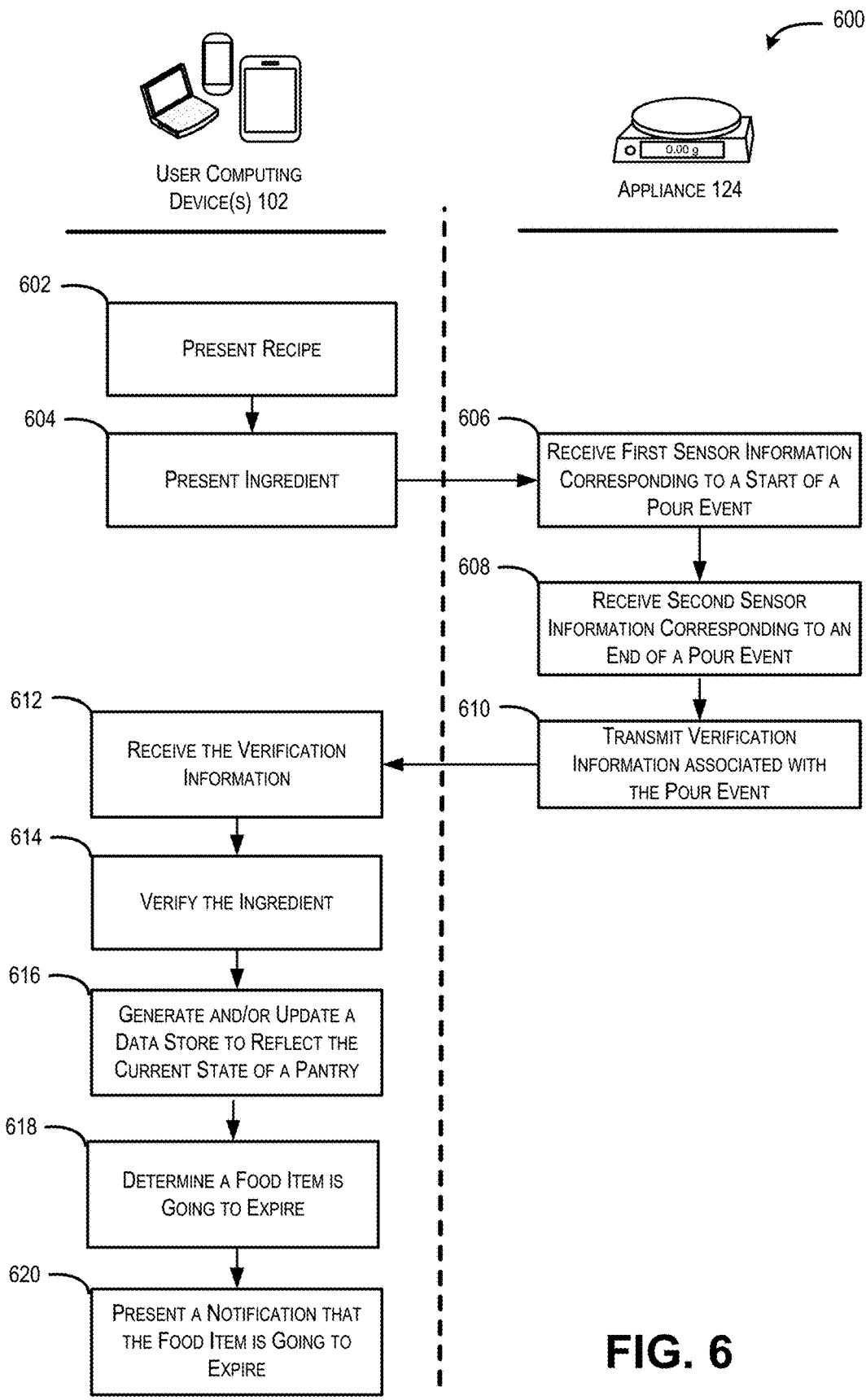
FIG. 6 is a flow diagram of illustrative process using corroborated point of consumption (POC) data for food consumed by an individual to provide notifications that a food item is going to expire.

FIGS. 3 and 6 are flow diagrams of illustrative processes illustrated as a collection of blocks in a logical flow graph, which represent a sequence of operations that can be implemented in hardware, software, or a combination thereof. The blocks are organized under entities and/or devices that may implement operations described in the blocks. However, other entities/devices may implement some blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 for presenting notifications that food items 108 in a smart pantry are going to expire. The process 300 may be implemented by the computing architecture 200 and in the environment 100 described above, or in other environments and architectures.

At 302, user computing device 102 receives food item information. Food item information may correspond to user input, sensor information, user account information, user point of consumption (POC) data, or other data that indicates that one or more food items 108 have been purchased and/or used in association with a user 104. In some embodiments, food item information may be manually entered into a user computing device 102, may be acquired by scanning the one or more food items 108 (e.g., bar code scan, QR code scan, RFID tag scan, photograph of food item packaging, etc.), photographing or scanning receipts of the one or more food items 108 purchase from a vendor, reading sensor data from one or more sensors in a smart storage space, etc.

Alternatively, or in addition, food item information may be received by user computing device 102 via account information associated with one or more user accounts, such as grocery store membership accounts, an account with a shopping list application, accounts associated with electronic shopping services, credit card accounts, or other user accounts that may provide information relating to food items 108 purchased or otherwise acquired by an individual. In some embodiments, food item information may be received from one or more applications and or/programs executing on user computing device 102 or another computing device.

At 304, user computing device 102 determines food item data. Food item data may be information relating to the one or more food items 108, such as types of food items 108; names of food items 108; brands of food items 108; number of units of food items 108; quantity of food items 108 remaining in a unit; expiration dates; dates that food items 108 were purchased; nutrition information; etc. In some embodiments, user computing device 102 determines the food item data based on the food item information. In some embodiments, user computing device 102 may determine one or more portions of the food item data directly from the food item information. For example, user computing device 102 may identify within a scanned image of a receipt quantities of food items 108 listed on the receipt. In another example, user computing device 102 may identify names of food items 108 within a description of the food items 108 that was input by a user 104.

Alternatively, or in addition, user computing device 102 may indirectly use information from the food item information to determine one or more portions of the food item data. For example, user computing device 102 may utilize an identifier associated with a food item 108 (e.g., name, UPC code, etc.) to access food item information for the food item 108. In some embodiments, user computing device 102 may use the identifier to request food item information from a locally stored database. Alternatively, or in addition, user computing device 102 may use the identifier to request food item information from a network resource, such as food item service 120 or pantry service 126.

At 306, user computing device 102 generates or updates data store 114 and/or consumption profile 116 to reflect the status of the food item 108. Data store 114 may be a database that contains food item data associated with the food items 108 stored in pantry 106. The data store may identify a collection of food items 108 that are stored in pantry 106, and/or information associated with the individual food items 108, such as nutritional information; brand information; food types; flavors; quantities/amounts of individual food items 108 stored in pantry 106 (e.g., 2 boxes of ramen, 1.3 lbs. of sugar, 3.5 oz. of olive oil, etc.); dates individual food items 108 were purchased; expiration data associated with individual food items 108; and/or other information. In some embodiments, user computing device 102 may generate or update data store 114 based on the food item data.

Alternatively, or in addition, user computing device 102 may generate and/or update a consumption profile 116 associated with the food item 108 based on the food item data. For example, based on user computing device 102 determining that the food item information verifies a consumption event where one cup of brown sugar is consumed, user computing device 102 may generate a consumption profile 116 associated with "one pound bag of brown sugar" so that is includes information about the consumption event. Example information about the consumption event may include one or more times associated with the consumption event (e.g., start time, end time, data of the consumption event, etc.), a purpose of the consumption event (e.g., a recipe associated with the consumption event, a holiday associated with the consumption event, etc.), one or more users 104 associated with the consumption event, an amount of the food item 108 consumed during the consumption event, an amount of the food item 108 remaining after the consumption event, etc.

In this way, as user computing device 102 determines that food item data verifies the occurrence of consumption events for a food item 108, user computing device 102 updates a corresponding consumption profile 116 for the food item 108 so that it contains data memorializing the verified consumption event. Therefore, user computing device 102 maintains the consumption profile 116 so that is contains a verified history of consumption events associated with the corresponding food item 108.

At 308, user computing device 102 determines that the food item 108 is going to expire. In some embodiments, user computing device 102 may determine that the food item 108 is going to expire based on the data store and/or a consumption profiles associated with the food item 108. User computing device 102 may determine the food item 108 is going to expire by comparing the current date to an expiration date stored in the data store and/or consumption profile associated with the food item 108. If the current date is on or after the expiration date, user computing device 102 may determine the food item 108 is going to expire.

In some embodiments, user computing device 102 may determine that the food item 108 is going to expire if the current date is within a threshold distance of the expiration date. For example, if the current date is within one week of the expiration date user computing device 102 may determine that the food item 108 is going to expire. The threshold may be predetermined for each food item 108, or may be determined by user computing device 102. The threshold may be determined based on the expected life of the food item 108 (e.g., milk is expected to last 2 weeks, flour is expected to last 2 years, etc.). User computing device 102 may determine that the food item 108 is going to expire when the ratio of the amount of time until the expiration date of the food to the expected life of the food item 108. For example, user computing device 102 may determine that a food item 108 is going to expire when less than 10% of its expected life is remaining before the food item 108 will expire.

User computing device 102 may also generate, based on data store 114 and/or a consumption profile 116 associated with the food item 108, an estimated time at which the food item will be fully consumed. For example, based on one or more consumption events captured in the food item's 108 consumption profile 116, user computing device 102 may predict a rate of future consumption of the food item 108. In some embodiments, user computing device 102 may compare the estimated time that the food item 108 will be fully consumed to an expiration date associated with the food item 108. If the estimated time that the food item 108 will be consumed is after the expiration date or within a threshold of the expiration date, user computing device 102 may determine that the food item 108 is going to expire. As noted above, the threshold may be predetermined for each food item 108, or may be determined based on the expected life of the food item 108.

At 310, user computing device 102 presents a notification that the food item 108 is going to expire. If user computing device 102 determines that the food item 108 is going to expire, user computing device 102 may provide a notification to a user 104 that includes one or more of: a message that the food item 108 is going to expire before it is fully consumed, a recommendation of one or more recipes that include the food item 108 to expedite consumption of the food item 108, a selectable option for obtaining an additional amount of the food item 108 (e.g., adding the food item 108 to a shopping list, acquiring the food item 108 from an online marketplace/grocery service, etc.), or a combination thereof. User computing device 102 may present a notification on a display of user computing device 102, or may present the notification to a different computing device for presentation.

FIG. 4 is an illustration 400 of a data store that maintains food item information for food items 108 in a pantry 106. FIG. 4 depicts a data store 114 that contains food item data 402 associated with the food items 108 stored in a pantry 106. Food item data 402 may include information associated with the individual food items 108, such as identifiers for individual food items 108; nutritional information; brand information; food types; flavors; quantities/amounts of individual food items 108 stored in pantry 106; dates individual food items 108 were purchased; expiration data associated with individual food items 108; and/or other information. FIG. 4 illustrates that portions of data store 114 may be stored on one or more memories associated with user computing device 102, pantry service 112, or both.

Figure 5:
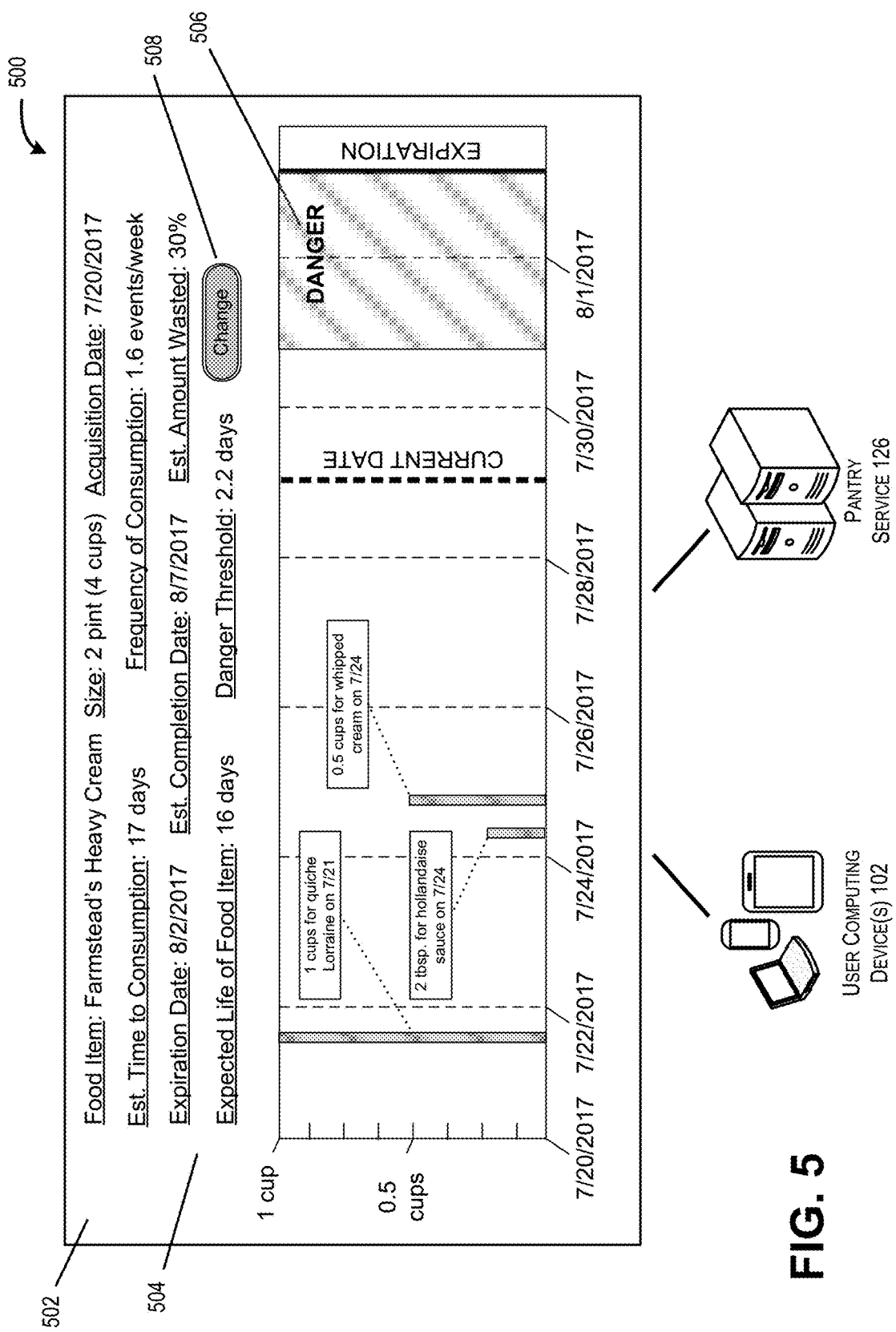
FIG. 5 is an example illustration of a graphical user interface that visually presents a consumption profile for a partially consumed food item.

FIG. 5 is an illustration 500 of a graphical user interface that visually presents a consumption profile 116 for a partially consumed food item 108. FIG. 5 depicts an example graphical user interface (GUI) 502 that visually presents information included within a consumption profile 116 associated with the food item 108 "heavy cream." In some embodiments, GUI 502 may be presented on one or more displays associated with user computing device 102, pantry service 126, or both. Alternatively, or in addition, GUI 502 may be presented on one or more displays associated with pantry 106 and/or appliances 124.

FIG. 5 depicts GUI 502 as displaying both typographical information 504 and visual information 506 associated with the food item 108 "heavy whipping cream." Typographical information 504 may include a name of the food item 108, a size of the food item 108, acquisition date, expiration date, frequency of consumption vents, etc. The consumption profile 118 depicted in GUI 502 is a partially completed consumption profile (i.e., the food item 108 has not been verified as having been completely consumed). Where the consumption profile is incomplete for the food item 108, typographical information 504 may include estimations for consumption of the food item 108 such as an estimated completion date, an estimated time to consumption, and an estimated amount wasted, etc. Typographical information 504 may include information relating to the threshold that user computing device 102 uses to determine if the food item 108 is going to expire, such as an expected life of the food item 108, a danger threshold within which user computing device 102 determines the food item 108 is going to expire or a notification is to be sent, etc. In some embodiments, the GUI 502 may include an option 508 to change one or more thresholds associated with the food item 108. The estimations may be computed by one or more of user computing device 102 and pantry service 126, and may be based upon verified consumption data associated with the food item 108, usage patterns of an associated user 104, usage patterns of other users 104, geographic or temporal usage trends, etc. In some embodiments, the option 508 may be a selectable element that, when selected, opens up an additional interface that enables a user 104 to execute on or more functionalities associated with a threshold, such as turning off the threshold for the item, setting a new threshold value, setting a new ratio of the time remaining to the expiration date to the expected life of the food item 108, or similar.

Visual information 506 may visually present consumption events of the item using one or more of a graph, pictogram, histogram, or other visual representation that conveys the history of consumption of the food item 108 corresponding to the consumption profile. Visual information 506 may include one or more visual representations of individual consumption events, which may depict information such as date of the consumption event, purpose of the consumption event, amount consumed during the consumption event, etc. Where the GUI 502 depicts a partially completed consumption profile, visual information 506 may include visual representations of an expiration date, a current date, an estimated completion date, anticipated and/or planned future consumption events, etc.

FIG. 6 is a flow diagram of an illustrative process 600 for using corroborated point of consumption (POC) data for food consumed by an individual to provide notifications that a food item 108 is going to expire. The process 600 may be implemented by the computing architecture 200 and in the environment 100 described above, or in other environments and architectures.

At 602, user computing device 102 presents a recipe. A recipe may include a set of instructions for preparing a particular food or drink item. In some embodiments, presenting a recipe may include causing a graphical recipe interface to be presented on a display. In some embodiments, a graphical recipe interface presents one or more recipe steps that are to be performed. The display may be part of user computing device 102, or may be a component of another computing device. In embodiments where user computing device 102 is incorporated as part of an appliance 124, a graphical recipe interface may be presented on a display incorporated into the appliance 124.

At 604, user computing device 102 identifies an expected ingredient. For example, user computing device 102 may determine an ingredient that is to be next added during completion of the recipe. An ingredient may include any component of a recipe, including raw food items 108 (e.g., eggs, butter, oats, carrots, chicken breast, etc.), and prepared food items 108 (e.g., ice cream, butter, pasta sauce, etc.). The expected ingredient may be selected based on a predetermined order associated with the recipe (e.g., always start recipe by adding flour), a suggested ingredient order (e.g., dry ingredients must be added before wet ingredients), past user behavior, contextual data, or other factors. In some embodiments, once an expected ingredient has been selected, user computing device 102 may cause a graphical recipe interface to include an ingredient block corresponding to the expected ingredient. Alternatively, or in addition, user computing device 102 may cause an audio instruction to add an ingredient to be presented.

At 606, an appliance 124 receives first sensor information corresponding to a start of a pour event. In some embodiments, the appliance 124 may be a kitchen scale configured to detect that an ingredient is being added to a container. For example, where user computing device 102 has directed a user 104 to add an ingredient to a container on a kitchen scale, the scale may detect that the container has been placed onto the scale, and then detect a change in the mass of the container indicative of the ingredient being added.

At 608, appliance 124 receives second sensor information corresponding to an end of the pour event. In some embodiments, the second sensor information may correspond to the mass of the container becoming stable. For example, where the appliance 124 is a kitchen scale, and here the kitchen scale has detected a change in mass of the container indicative of an ingredient being added, the kitchen scale may detect that the mass of the container has remained stable for a set period of time. In some embodiments, the kitchen scale may determine that the mass has remained stable based on the mass remaining within a threshold range for a preset period of time.

At 610, appliance 124 transmits verification information associated with the pour event to user computing device 102. For example, appliance 124 may determine a portion of sensor data that is indicative of a pour event, and transmit the portion of data to user computing device 102. Alternatively, transmitting verification information may include the appliance 124 transmitting all sensor data to user computing device 102. Verification information may be transmitted from appliance 124 to user computing device 102 via a wired or wireless connection. In some embodiments, where user computing device 102 is integrated into appliance 124, verification information may be passed between one or more sensors of the appliance and a point of consumption application executing on user computing device 102 via one or more internal connections.

At 612, user computing device 102 receives the pour event information from the appliance 124. For example, where appliance 124 is a kitchen scale and an ingredient is added to a container placed upon the kitchen scale, appliance 124 may transmit verification information corresponding to one or more of the change of mass, an initial mass, a final mass, timing information for the pour event, etc.

At 614, user computing device 102 verifies the ingredient as being added. For example, user computing device 102 may compare the sensor data included in the verification information to expected sensor information for the expected ingredient. In some embodiments, user computing device 102 may know a change in mass that is to be expected when an ingredient is added, and may compare the verification data to the expected mass. The expected sensor information may be included within the recipe data for the recipe, or may be computed by user computing device 102 using characteristics of the ingredient. For example, recipe data for the recipe may indicate that one teaspoon of baking soda has a mass of 11 grams. User computing device 102 can then compute the expected sensor information for 2 tablespoons of baking soda using the ratio of 1 tsp.=11 g.

If the verification information indicates that the sensor data is within a threshold range of similarity (e.g., plus or minus a threshold percentage, a threshold numerical amount, etc.), then user computing device 102 may verify the ingredient as having been added. If the verification information is outside the threshold range, user computing device 102 may determine that the sensor data is indicative of a mistake by the user 104 (i.e., the user 104 added too much or too little of an ingredient), and user computing device 102 may cause an alert to be provided to the user 104. Alternatively, or in addition, user computing device 102 may present a notification to a user 104 that there has been a mistake, and/or present a suggested action for the user 104 to take fix the mistake (e.g., adjust the proportions of other ingredients within the recipe to compensate for the mistake).

At 616, user computing device 102 generates or updates data store 114 and/or consumption profile 116 to reflect the status of the food item 108. Data store 114 may be a database that contains food item 108 data associated with the food items 108 stored in pantry 106. For example, where user computing device verifies that ½ cup of olive oil has been added to a container, user computing device 102 may update data store 114 to reflect that the amount of olive oil stored in the pantry 106 has reduced by ½ cup. Alternatively, or in addition, if data store 114 previously didn't indicate that olive oil was stored in the pantry 106, user computing device 102 may update data store 114 so that it reflects that olive oil is stored in the pantry 106. Data store 114 may identify a collection of food items 108 that are stored in pantry 106, and/or information associated with the individual food items 108, such as nutritional information; brand information; food types; flavors; quantities/amounts of individual food items 108 stored in a pantry 106; dates individual food items 108 were purchased; expiration data associated with individual food items 108; and/or other information. In some embodiments, user computing device 102 may generate or update data store 114 based on user computing device 102 verifying that the ingredient was added.

Alternatively, or in addition, user computing device 102 may generate and/or update a consumption profile 116 associated with the food item 108 based on user computing device 102 verifying that the ingredient was added. For example, based on user computing device 102 determining that the verification information corroborated that 10 ounces of vinegar was added to a container, user computing device 102 may update a consumption profile 116 associated with "a 32-ounce bottle of vinegar" so that it includes information about the verified consumption event (i.e., the ingredient being added). Example information about the consumption event may include one or more times associated with the consumption event (e.g., start time, end time, data of the consumption event, etc.), a purpose of the consumption event (e.g., a recipe associated with the consumption event, a holiday associated with the consumption event, etc.), one or more users 104 associated with the consumption event, an amount of the food item 108 consumed during the consumption event, an amount of the food item 108 remaining after the consumption event, etc.

At 618, user computing device 102 determines that the food item 108 is going to expire. In some embodiments, user computing device 102 may determine that the food item 108 is going to expire based on data store 114 and/or a consumption profile 116 associated with the food item 108. User computing device 102 may determine the food item 108 is going to expire by comparing the current date to an expiration date stored in data store 114 and/or consumption profile 116 associated with the food item 108. If the current date is on or after the expiration date, user computing device 102 may determine the food item 108 is going to expire.

In some embodiments, user computing device 102 may determine that a food item 108 is going to expire if the current date is within a threshold distance of an expiration date. For example, if the current date is within one week of an expiration date for a food item 108 user computing device 102 may determine that the food item 108 is going to expire. A threshold may be predetermined for each food item 108, or may be determined by user computing device 102. A threshold may be determined based on the expected life of a food item 108 (e.g., milk is expected to last 2 weeks, flour is expected to last 2 years, etc.). User computing device 102 may determine that a food item 108 is going to expire when the ratio of the amount of time until the expiration date of the food item 108 to the expected life of the food item 108. For example, user computing device 102 may determine that a food item 108 is going to expire when less than 10% of its expected life is remaining before the food item 108 will expire.

User computing device 102 may also generate, based on data store 114 and/or a consumption profile 116 associated with the food item 108, an estimated time at which the food item 108 will be fully consumed. For example, based on one or more consumption events captured in a food item's 108 consumption profile 116, user computing device 102 may predict a rate of future consumption of the food item 108. In some embodiments, user computing device 102 may compare an estimated time that the food item 108 will be fully consumed to an expiration date associated with the food item 108. If the estimated time that the food item 108 will be consumed is after the expiration date or within a threshold of the expiration date, user computing device 102 may determine that the food item 108 is going to expire. As noted above, the threshold may be predetermined for each food item 108, or may be determined based on the expected life of the food item 108.

At 620, user computing device 102 presents a notification that the food item 108 is going to expire. If user computing device 102 determines that the food item 108 is going to expire, user computing device 102 may provide a notification to a user 104 that includes one or more of: a message that the food item 108 is going to expire before it is fully consumed, a recommendation of one or more recipes that include the food item 108 to expedite consumption of the food item 108, a selectable option for obtaining an additional amount of the food item 108 (e.g., adding the food item 108 to a shopping list, acquiring the food item 108 from an online marketplace/grocery service, etc.), or a combination thereof. User computing device 102 may present the notification on a display of user computing device 102, or may present the notification to a different computing device for presentation.

FIGS. 7A and 7B are example illustrations 700 and 750 of a user computing device 702 and an appliance 752 configured to capture verification data to corroborate consumption events. While user computing device 702 and appliance 752 are depicted as being separate entities, a person having ordinary skill would understand that in some embodiments one or more of the components described as being a part of user computing device 702 and appliance 752 may be integrated into a single device.

FIG. 7A illustrates an exemplary environment 700 for guiding a user 104 through the completion of a recipe. FIG. 7A depicts a user computing device 702 presenting a recipe interface on a display 704. FIG. 7A depicts user computing device 702 as a smartphone, but in different embodiments user computing device 702 may be any type of computing device (e.g., tablet, personal computer, laptop, voice controlled computing device, server system, etc.) able to present an interface, or cause the presentation of a recipe interface to occur on a display on a separate device.

A recipe interface may present a recipe 706. In some embodiments, a recipe interface may present one or more steps 708 and 710. The steps may correspond to instructions to add ingredients and/or perform actions during the course of making the recipe.

A recipe interface may include a current step 708 that a user 104 is to perform. In some embodiments, user computing device 702 may be configured to receive verification data 122 from an appliance 124 associated with the current step 708. For example, when the current step 708 corresponds to an ingredient to be added, user computing device 702 may receive verification data 122 from a scale that indicates a change in the mass of a container indicative of an ingredient being added to the container. In some embodiments, the current step 708 may be presented as an unfilled block, and as user computing device 702 receives verification data 122 indicative of such a change in mass, user computing device 702 may present an animation effect 712 where the empty block is filled in accordance with verification data 122. For example, if the current step calls for a user 104 to add 2 cups of all-purpose flour, and verification data 122 indicates a change in mass corresponding to 1 cup of flour being added (i.e. approximately 120 grams), then the animation effect 712 may cause the block to be presented as half filled. In another example, where a step may be to mix ingredients for a period of time, when user computing device 702 receives verification data 122 indicative of an electric mixer being started, user computing device 702 may present a timer or animation to assist a user 104 in mixing for the correct amount of time. User computing device 702 may also include one or more sensors 714 and 716 for detecting audio and visual inputs. User computing device 702 may also be configured to receive inputs via a physical interface (e.g., buttons, keyboard, etc.) and/or the display (i.e., via a touchscreen).

FIG. 7B illustrates an exemplary environment 750 where an appliance 752 detects information indicative of the completion of an ingredient step, and transmits verification information to corroborate the completion of the ingredient step. FIG. 7B depicts an appliance 752 having a display 754. FIG. 7B depicts appliance 752 as a scale, but in other embodiments the appliance may be an oven, blender, mixer, refrigerator, food thermometer, another type of tool used to store and/or prepare food/drinks, or a combination thereof.

FIG. 7B further depicts a container 756 placed atop the scale and an ingredient 758, where a portion of the ingredient 760 is being added to the container 756. As the portion of the ingredient 760 is added to the container 756, the appliance 752 is able to detect a change in mass of the container 756, and may transmit verification data 122 indicating the change of mass. In this way, an entity receiving verification data 122 can corroborate that addition of the ingredient occurred using physical evidence that the ingredient was added. Additionally, the receiving entity can also generate consumption data that reflects the actual amount of the ingredient that was actually added by a user 104.

In some embodiments, appliance 752 may include a sensor 762 to capture brand information 764 for the ingredient 758. For example, sensor 762 may be a camera configured to capture an image of the ingredient. Verification data 122 may include the captured image, or may include one or more characteristics (e.g., packaging, dimensions, colors, brand, labels, etc.) that are determined from the image. Sensor 762 may be configured to capture information included, conveyed, or otherwise associated with a tag 766 located on ingredient 758. Tag 766 may be a visual tag (e.g., a barcode, QR code, etc.) or another type of tag configured to identify an ingredient or otherwise convey information associated with the ingredient (e.g., RFID, embedded chip, etc.).

FIGS. 8A and 8B are example illustrations 800 and 850 of user computing devices displaying notifications that a food item 108 has expired and is going to expire, respectively. While the user computing device is depicted as a mobile device, a person having ordinary skill would understand that the user computing device may be any one of a smartphone, tablet, personal computer, laptop, voice controlled computing device, server system, or other computing system, or a combination thereof.

FIG. 8A illustrates an exemplary illustration 800 of a notification that a food item 108 has expired. FIG. 8A depicts a user computing device 802 having a display 804. Display 804 may present a notification 806 that a food item 108 has expired. In some embodiments, notification 806 may include a message that provides information about a food item 108 expiring, such as; the name of the food item 108 that expired, the expiration date of the food item 108, a health warning about consuming expired food items 108, etc. In some embodiments, notification 806 may also include one or more selectable elements that enable a user 104 to take one or more actions relating to the expiration of a food item 108. For example, notification 806 may include one or more of a selectable element 810 relating to a functionality for indicating that a food item 108 has been removed from the pantry 106, selectable element 812 relating to a functionality for purchasing more of the food item 108 (e.g., via an online marketplace), or selectable element 814 relating to a functionality for adding the food item 108 to a shopping list. In reaction to user computing device 802 receiving a selection of selectable element 810, one or more of data store 114 and or a consumption profile 116 associated with the food item 108 may be updated to indicate that the food item 108 is no longer stored in the pantry 106.

FIG. 8B illustrates an exemplary illustration 850 of a notification that a food item 108 is going to expire. FIG. 8B depicts a user computing device 852 having a display 854. Display 854 may present a notification 856 that a food item 108 has expired. In some embodiments, notification 856 may include a message 858 that provides information about the food item 108 that is going to expire, such as; the name of the food item 108 that is expiring, a health warning about consuming expired food items 108, etc. Notification 856 may also include one or more statistics 860 associated with the food item 108 such as; the expiration date of the food item 108, an estimated time of completion of the food item 108, an amount of the food item 108 remaining in the pantry 106, etc.

In some embodiments, the notification 854 may also include one or more selectable elements that enable a user 104 to take one or more actions relating to the expiration of the food item 108. For example, the notification may include one or more of a selectable element 862 relating to a functionality for purchasing more of the food item 108 (e.g., via an online marketplace), selectable element 864 relating to a functionality for viewing recipes that include the food item 108, or selectable element 864 relating to a functionality for viewing other food items 108 stored in the pantry 106 that are about to expire. In reaction to user computing device 852 receiving a selection of selectable element 866, user computing device 852 may present an additional interface that presents a list of one or more items in the pantry 106 that are going to expire, or are within a threshold time/ratio from expiring.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   receiving, by an electronic device, first sensor information associated with a food item;
   determining, by the electronic device, that the first sensor information verifies a first consumption event associated with a quantity of the food item being consumed;
   determining, based at least in part on the first consumption event, that the food item is going to expire before the food item is fully consumed;
   presenting, on a display associated with the electronic device, a notification that the food item is going to expire before the food item is fully consumed;
   receiving, by the electronic device, second sensor information associated with the food item; and
   determining that the second sensor information verifies an occurrence of a second consumption event associated with an additional quantity of the food item being consumed,
   wherein determining that the food item is going to expire before the food item is fully consumed is further based at least in part on the second consumption event.

2. The computer-implemented method of claim 1, wherein the first and second sensor information comprises first and second sensor data, respectively, detected by a sensor associated with an appliance, the appliance being one of an electric scale, an electric blender, an oven, and a refrigerator.

3. The computer-implemented method of claim 1, wherein determining that the food item is going to expire before the food item is fully consumed comprises:
   determining, based at least in part on (i) the first sensor information that verifies the first consumption event associated with the quantity of the food item being consumed and (ii) the second sensor information that verifies the second consumption event associated with the additional quantity of the food item being consumed, an estimated time that the food item will be completely consumed; and
   determining that the estimated time when the food item will be fully consumed is after an expiration data associated with the food item.

4. The computer-implemented method of claim 1, wherein the first and second consumption events each comprises one or more of:

a quantity of the food item being used to make a recipe;
the quantity of the food item being added to a container; and
the quantity of the food item being eaten.

5. The computer-implemented method of claim 1, wherein presenting the notification that the food item is going to expire before the food item is fully consumed comprises presenting, on a display associated with the electronic device, a selectable option for obtaining an additional amount of the food item.

6. The computer-implemented method of claim 1, wherein presenting the notification that the food item is going to expire before the food item is fully consumed comprises presenting, on a display associated with the electronic device, a recommendation of a recipe associated with the food item.

7. The computer-implemented method of claim 1, further comprising:
   presenting, on the display associated with the electronic device, a recipe step associated with an amount of the food item; and
   wherein determining that the first sensor information verifies the first consumption event comprises determining that the amount of the food item corresponds to the quantity of the food item, and
   wherein determining that the second sensor information verifies the second consumption event comprises determine that the amount of the food item corresponds to the quantity of the food item.

8. The computer-implemented method of claim 7, wherein the first and second sensor information is received via a sensor component of one of an electronic cooking scale or electronic blender.

9. A non-transitory computer-readable storage medium having thereon at set of instructions, which if performed by a computer, cause the computer to:
   receive first sensor information associated with a food item;
   determine that the first sensor information verifies a first consumption event associated with a quantity of the food item being consumed;
   determine, based at least in part on the first consumption event, that the food item is going to expire before the food item is fully consumed;
   present, on a display associated with an electronic device, a notification that the food item is going to expire before the food item is fully consumed;
   receive second sensor information associated with the food item; and
   determine that the second sensor information verifies an occurrence of a second consumption event associated with an additional quantity of the food item being consumed,
   wherein determine that the food item is going to expire before the food item is fully consumed is further based at least in part on the second consumption event.

10. The non-transitory computer-readable storage medium as recited in claim 9, wherein the instructions further cause the computer to:
   present, on a display associated with the computer, a recipe step associated with an amount of the food item; and
   wherein determine that the first sensor information verifies the first consumption event comprises determine that the amount of the food item corresponds to the quantity of the food item, and
   wherein determine that the second sensor information verifies the second consumption event comprises determine that the amount of the food item corresponds to the quantity of the food item.

11. The non-transitory computer-readable storage medium as recited in claim 10, wherein the first and second sensor information is received via a sensor component of one of an electronic cooking scale or electronic blender.

12. The non-transitory computer-readable storage medium as recited in claim 9, wherein determine that the food item is going to expire before the food item is fully consumed comprises:
   determine, based at least in part on (i) the first sensor information that verifies the first consumption event associated with the quantity of the food item being consumed and (ii) the second sensor information that verifies the second consumption event associated with the additional quantity of the food item being consumed, an estimated time that the food item will be completely consumed; and
   determine that the estimated time when the food item will be fully consumed is after an expiration data associated with the food item.

13. The non-transitory computer-readable storage medium as recited in claim 9, wherein present the notification that the food item is going to expire before the food item is fully consumed comprises present, on the display associated with the electronic device, a recommendation of a recipe associated with the food item.

14. The non-transitory computer-readable storage medium as recited in claim 9, wherein the first and second sensor information comprises first and second sensor data, respectively, detected by a sensor associated with an appliance, the appliance being one of an electric scale, an electric blender, an oven, and a refrigerator.

15. The non-transitory computer-readable storage medium as recited in claim 9, wherein the first and second consumption events each comprises one or more of:
   a quantity of the food item being used to make a recipe;
   the quantity of the food item being added to a container; and
   the quantity of the food item being eaten.

16. The non-transitory computer-readable storage medium as recited in claim 9, wherein present the notification that the food item is going to expire before the food item is fully consumed comprises present, on a display associated with the electronic device, a selectable option for obtaining an additional amount of the food item.

* * * * *